(12) United States Patent
Wade

(10) Patent No.: US 11,247,858 B2
(45) Date of Patent: Feb. 15, 2022

(54) VACUUM LIFTER

(71) Applicant: Colin Maxwell Wade, Bury St Edmunds (GB)

(72) Inventor: Colin Maxwell Wade, Bury St Edmunds (GB)

(73) Assignee: Kongsberg Precision Cutting Systems Belgium BV, Ghent (BE)

( * ) Notice: Subject to any disclaimer, the term of this patent is extended or adjusted under 35 U.S.C. 154(b) by 238 days.

(21) Appl. No.: 16/637,027

(22) PCT Filed: Aug. 10, 2018

(86) PCT No.: PCT/IB2018/056054
§ 371 (c)(1),
(2) Date: Feb. 6, 2020

(87) PCT Pub. No.: WO2019/030729
PCT Pub. Date: Feb. 14, 2019

(65) Prior Publication Data
US 2020/0239249 A1 Jul. 30, 2020

(30) Foreign Application Priority Data
Aug. 10, 2017 (GB) .................................... 1712829

(51) Int. Cl.
*B25J 15/06* (2006.01)
*B65H 3/08* (2006.01)
(Continued)

(52) U.S. Cl.
CPC ............. *B65H 3/0816* (2013.01); *B08B 5/02* (2013.01); *B08B 5/04* (2013.01); *B25J 9/0096* (2013.01);
(Continued)

(58) Field of Classification Search
CPC ....... B25J 9/0096; B25J 15/0616; B08B 5/02; B08B 5/04; B65H 3/0816; B65H 3/0883; B65H 2301/5115
(Continued)

(56) References Cited

U.S. PATENT DOCUMENTS 5,074,539 A * 12/1991 Wells ..................... B65H 3/126
271/12
5,971,454 A * 10/1999 Baan ..................... B25B 11/007
294/188

(Continued)

FOREIGN PATENT DOCUMENTS

CN 206375407 U 8/2017
DE 36 37 567 A1 5/1988
(Continued)

OTHER PUBLICATIONS

Kongsberg Cutting Tables and Digital Cutters, Esko, Apr. 17, 2017, https://www.esko.com/en/product/kongsberg-cutting tables.
(Continued)

*Primary Examiner* — Lynn E Schwenning
(74) *Attorney, Agent, or Firm* — Burr & Brown, PLLC

(57) ABSTRACT

A vacuum plate lifting system for lifting sheet material articles, comprises a vacuum lifter apparatus for lifting sheet material articles, a lifter actuation system configured to lift and/or move the vacuum lifter apparatus during use and a control system, the control system being configured to control the lifter actuation system during said movement. The vacuum lifter apparatus comprises: a substantially horizontal suction plate; an airflow suction system for conveying vacuum air pressure to said perforated suction lifting surface; at least one mount for connection of the suction plate to at least one actuator of the lifter actuation system for lifting and/or moving the suction plate during use. At least one elongate bar is movably mounted along an edge of the
(Continued)

suction plate. A bar actuation system is configured to drive movement of said bar between a raised orientation and a lowered orientation.

13 Claims, 19 Drawing Sheets

(51) Int. Cl.
  *B08B 5/04* (2006.01)
  *B25J 9/00* (2006.01)
  *B08B 5/02* (2006.01)
(52) U.S. Cl.
  CPC ........ *B25J 15/0616* (2013.01); *B65H 3/0883* (2013.01); *B65H 2301/5115* (2013.01)
(58) Field of Classification Search
  USPC .................................................. 294/183, 185
  See application file for complete search history.

(56) References Cited

U.S. PATENT DOCUMENTS

| | | | |
|---|---|---|---|
| 7,296,834 B2* | 11/2007 | Clark | B25J 15/0616 294/65 |
| 10,610,958 B2* | 4/2020 | Regan | B23K 20/10 |
| 2004/0148050 A1* | 7/2004 | Brosi | B08B 5/04 700/123 |
| 2005/0235910 A1* | 10/2005 | Teng | B08B 5/04 118/302 |
| 2007/0079475 A1* | 4/2007 | Tagliaferri | A47L 9/02 15/415.1 |
| 2019/0029488 A1* | 1/2019 | Evans | A47L 11/4094 |

FOREIGN PATENT DOCUMENTS

| | | |
|---|---|---|
| DE | 20 2009 014 154 U1 | 2/2010 |
| JP | 2001-139173 A1 | 5/2001 |
| JP | 2006-298591 A1 | 11/2008 |
| WO | 2017/075133 A2 | 5/2017 |

OTHER PUBLICATIONS

International Search Report and Written Opinion (PCT/IB2018/056054) dated Dec. 12, 2018.
British Search Report (1712829.9) dated Feb. 12, 2018.
The International Preliminary Report on Patentability (Chapter I)(Application No. PCT/IB2018/056054) dated Feb. 11, 2020, 7 pages.

* cited by examiner

VACUUM LIFTER

BACKGROUND a. Field of the Invention

The present invention relates to a vacuum lifter apparatus which may be used as part of a robotic sheet material lifting and handling system for lifting, moving and depositing sheet material articles, for example semi-rigid sheet plastic, sheet metal, paper-backed foam board, plywood sheeting, solid cardboard, and corrugated cardboard and any other types of sheet materials which in a production environment may need to be cut and handled by machinery.

b. Related Art

There is often a need in a manufacturing operation to individually handle sheets of material, particularly those with sufficient strength to support their own weight. A process step may be used to modify the material, or the material may simply be moved. The sheet material may, for example, be cut, creased, folded, embossed, printed upon, transported or stacked. The sheet material may need to be lifted and moved from an input stack of sheets and placed on a cutting table, a printing table or other type of processing work station, as part of the process. After cutting, cut material will be need to be moved off the table and deposited at one or more stacks of cut or printed planiform articles, which requires accurate stacking of one layer of sheet material on another. In the following description, any such location where planiform articles are to be placed on and/or lifted off by sheet material handling equipment is referred to herein as a "work station".

A specific example of a prior art work stations that may be used to cut or score fold lines in cardboard, are those supplied by Esko-Graphics bvba (see https://www.esko.com/en/products/kongsberg-cutting-tables). Cuts in sheet material are made by a reciprocating vertical blade that is moved on a 2-axis Cartesian robotic actuator that moves over the work surface. Score lines can be formed in a similar manner by a scoring wheel mounted to the actuator. The cuts or fold lines for more than one such box may be made in a single sheet, depending on the size of the boxes being formed.

These work stations can be used with robotic sheet material handlers that comprise a machine vision system and a vacuum lifting apparatus (also called a suction lifting apparatus) comprising a vacuum lifter apparatus that provides a downwardly oriented, planar suction lifting surface, and an actuation system for lifting, horizontally moving and lowering the vacuum lifter apparatus. Any such actuation system will, for convenience, be referred to below as a "lifter actuation system". Examples of downwardly oriented suction lifting surfaces include a flat metallic plate, which is typically square or rectangular, perforated with an array of vacuum holes. The holes are connected to a source of vacuum pressure for applying vacuum suction through an array of holes in the plate. The source of vacuum pressure is usually at the higher end of what is termed "low vacuum", typically between about 0.1 and 0.5 of atmospheric pressure.

The array of vacuum holes may be a square or rectangular array along both horizontal (X- and Y-) directions. The holes are on centres spaced apart by between about 5 mm and 30 mm, and more typically about 15 mm. The actuation system then moves the vacuum lifter apparatus in opposite horizontal linear directions along both the X- and Y-directions, and in both directions, up or down, along the vertical (Z-) direction. The actuation system may be a robotic arm with multiple degrees of freedom of movement and rotation at a manipulating end of the arm. The vacuum plate may be supported centrally at a manipulating end of the arm. Such an arm may lift and deposit sheet material within the reach of the arm anywhere on the processing work station and adjacent stacking work stations, within the reach of the arm.

Other types of robotic sheet material handlers may alternatively be used, for example, a linearly movable gantry that spans the cutting and scoring work station, beneath which is supported the vacuum lifter apparatus. This is a simpler and more economical way for lifting, moving and depositing sheet material, but is limited to drawing from or forming a stack along the line of travel of the gantry.

After placement on the processing work station, the sheet material may be held down in a horizontal orientation by a vacuum hold-down, while a cutting and scoring process, and/or an ink jet printing process is completed. Such cutting operations generate waste material that has to be separated later on from the desired, or processed, sheet material.

These production systems work well, but are limited in their speed of movement owing to the weight of the vacuum lifter apparatus and the actuating power of the actuation system. This problem has become more acute as the speed of processing work stations has increased. From an economic perspective, it has also become ever more important to make greater utilization of processing work stations as their capability and cost has increased.

Another common limitation is the need, when material is cut, is to separate useful product and waste trimmings and to manually deal with dust or fragments on the processing work station after a cutting operation. The stacked material after processing on the processing work station may also need sorting or separating into separate stacks.

An example of a situation where such problems arise is the cutting of sheets of corrugated cardboard, prior to forming into box containers, for example by folding and gluing operations. The initial sheet stock may have standard dimensions, such as, for example, 3.2 m×1.6 m. Prior to lifting and placing on the processing work station, the sheet material may be in a relatively tall stack, for example between 1m and 2 m high. Quite often, the topmost layers of such stacks are not very level or flat, and may exhibit shallow dips and humps across the top face of the uppermost sheet. The vacuum lifter apparatus will have effectively a planar downwardly oriented lifting surface, which may therefore not achieve a proper contact across a sufficient extent of the top face to suck the top sheet into full contact with the lifting surface, with the result that the top sheet is not lifted or securely held if lifted only by across a portion of its top face.

Generally, time is lost owing to the above difficulties during which expensive equipment is left idle, and even when such difficulties do not arise, workers may need to be on hand to monitor the performance of the robotic sheet material lifting and handling system.

It is an object of the present invention to provide a vacuum lifter apparatus which may, for example, be used as part of an automated sheet material processing apparatus and also a method of using a vacuum lifter apparatus to lift sheet material articles, that addresses at least some of these problems.

SUMMARY OF THE INVENTION

According to the invention, there is provided a vacuum plate lifting system for lifting sheet material articles, comprising a vacuum lifter apparatus for lifting sheet material articles, a lifter actuation system configured to lift and/or move the vacuum lifter apparatus during use and a control system, the control system being configured to control the lifter actuation system during said movement, the vacuum lifter apparatus comprising:

a substantially horizontal suction plate comprising a perforated suction lifting surface, said surface being downwardly oriented for making contact with an upper surface of said articles to be lifted;

an airflow suction system for conveying vacuum air pressure to said perforated suction lifting surface;

at least one mount for connection of the suction plate to at least one actuator of the lifter actuation system for lifting and/or moving the suction plate during use, wherein:

the vacuum plate lifting system further comprises at least one elongate bar movably mounted along an edge of the suction plate, said bar comprising one or more nozzles, said nozzles being connected to a source of air pressure for providing a suction airflow of air into said nozzles;

a bar actuation system configured to drive movement of said bar between a raised orientation in which the bar is raised relative to a level of said suction lifting surface and a lowered orientation in which the bar is substantially at or below the level of said suction lifting surface whereby, in use, said suction airflow acts on a surface to be cleaned beneath said suction lifting surface when said bar is in the lowered orientation; and wherein the control system is operable to control the operation of the lifter actuation system and the operation of the bar actuation system to provide a sweeping movement of said bar in said lowered orientation across said surface to be cleaned whereby said suction airflow sweeps across said surface to be cleaned.

The suction plate may be substantially square or rectangular in a horizontal plane. The bar may then be mounted along a substantially straight edge of the suction plate.

In a preferred embodiment of the invention, there is one bar mounted along an edge of the suction plate.

The bar may be movably mounted to the suction plate at a pair of hinges proximate opposite ends of the bar.

Each of the hinges is preferably pivotably mounted to an edge of the suction plate adjacent the edge of the suction plate along which the bar is mounted.

The, or each, nozzle may be an elongate slot in an outer face of the bar, the slot then extending in a direction substantially parallel with the length of the bar.

The lifter actuation system preferably comprises a robotic arm configured to lift and/or move the vacuum lifter apparatus during use. The invention in its various aspects is, however applicable to other types of movement actuator for lifting and moving the vacuum lifter apparatus.

The vacuum lifter apparatus may comprise at least one mount on an upper surface thereof, the actuation system being physically connected to the suction plate via this mount.

In particular, the suction plate is preferably supported beneath the mount in a substantially horizontal orientation for lifting and depositing the sheet material articles The bar actuation system may comprise a pneumatic lifter acting between an upper surface of the suction plate and the bar.

Also according to the invention, there is provided a method of using a vacuum plate lifting system to sweep dust or debris from a surface to be cleaned, the vacuum plate lifting system being as claimed in any preceding claim, and the method comprising the steps of:

using the control system to control the movement of said bar by the bar lifter system to place said bar in the raised orientation;

with said bar in the raised orientation, using the control system to control the movement of the vacuum lifter apparatus by the lifter actuation system during lifting by the suction lifting surface of a sheet material article from a work surface and subsequent deposition of said lifted article away from the work surface;

using the control system to control the movement of said bar by the bar lifter system to place said bar in the lowered orientation;

after said deposition, using the control system to control the movement of the vacuum lifter apparatus by the lifter actuation system to return the suction lifting surface above a surface to be cleaned; and with said bar in the lowered orientation, applying said suction airflow across said surface to be cleaned while using the control system to control a sweeping movement of said bar across said surface to be cleaned whereby said vacuum airflow sweeps across said surface to be cleaned to remove dust or debris from said surface.

The surface to be cleaned may be the work surface, in which case the vacuum sweep may be performed prior to subsequent deposition of another sheet material article on the work surface.

The surface to be cleaned may, however, be another surface, for example a top surface of the deposited sheet, or the top surface of the next sheet to be lifted.

Also described herein is a vacuum lifter apparatus for lifting sheet material articles, comprising an upper chassis joined to a substantially planar lower suction plate and an airflow suction system for conveying vacuum air pressure to the suction plate, wherein:

the suction plate comprises a lower side and an upper side, the upper side of the suction plate being affixed to the chassis, and the suction plate lower side providing a downwardly oriented and substantially planar suction lifting surface for making contact with the upper surface of said articles, and said suction lifting surface comprising a plurality of laterally adjacent portions, each of said portions comprising a plurality of orifices through which, in use, air is drawn along airflow paths by the airflow suction system to provide a suction lifting pressure; and the airflow suction system comprises at least one air outlet for connection to a source of vacuum air pressure, and between said outlet and the suction plate at least one airflow manifold, said manifold comprising a plurality of branched ends, said ends being configured to convey said vacuum air pressure from said outlet to corresponding portions of the suction plate.

Airflow paths from adjacent portions of the suction plate are preferably isolated from each other by one or more air flow barriers between the adjacent portions.

The airflow paths for each portion of the suction plate preferably lead into only one corresponding branched end of the manifold.

A lower side of the chassis may comprise a plurality of downwardly-concave recesses.

Preferably, these recesses are spanned by the upper side of the suction plate along seams where the chassis is joined to the lower suction plate, each of these recesses providing one of the branched ends of the airflow manifold. The seams are preferably air-tight.

Each recess may be bounded by a rim. The upper side of the suction plate may then be affixed to the chassis along each of the rims.

The suction plate is most preferably composed of a plurality of adjacent suction modules. Each suction module may comprise a housing, the housing comprising opposite top and bottom walls. The bottom walls may then together provide the lower side of the suction plate. Each top wall preferably has at least one air outlet into a corresponding one of the recesses. The bottom walls may each be perforated with the orifices through which air is drawn.

The chassis may comprise a mounting portion for mounting the chassis to an actuator for lifting and/or moving the vacuum lifter apparatus during use. The suction plate is then supported beneath the chassis during use.

The mounting portion is preferably in a central portion of the chassis.

The mounting portion is preferably provided on an upper side of the chassis.

Also described herein is a vacuum plate lifting system for lifting sheet material articles, comprising a vacuum lifter apparatus for lifting sheet material articles, a lifter actuation system configured to lift and/or move the vacuum lifter apparatus during use and a control system, the control system being configured to control the lifter actuation system during said movement, the vacuum lifter apparatus comprising:

a substantially horizontal suction plate comprising a perforated suction lifting surface, said surface being downwardly oriented for making contact with an upper surface of said articles to be lifted;

an airflow suction system for conveying vacuum air pressure to said perforated suction lifting surface;

at least one mount for connection of the suction plate to at least one actuator of the lifter actuation system for lifting and/or moving the suction plate during use, wherein:

at least one suction lifter proximate an edge of the suction plate, said suction lifter comprising a downwardly oriented suction cup, said cup being movably mounted in a substantially vertical direction relative to the suction plate and being connected to a source of air pressure for providing air suction to said cup for plucking upwards a local area of said of articles to be lifted;

a suction cup actuation system configured to drive said movement of the suction cup between a raised orientation in which the suction cup is raised relative to a level of said suction lifting surface and a lowered orientation in which the suction cup is substantially at or below the level of said suction lifting surface whereby, in use, said air suction is directed substantially downwardly towards a sheet material article to be lifted when said suction cup is in the lowered orientation;

wherein the control system is operable to control the operation of the lifter actuation system and the operation of the suction cup actuation system to initially pluck said local area of said article to be lifted prior to applying said vacuum air pressure to said perforated suction lifting surface to lift the remainder of said article.

The suction plate may have a substantially square or rectangular profile in a horizontal plane. In a preferred embodiment, are three of the suction lifters with two of these lifters being mounted along adjacent edges of the suction plate proximate a corner of the rectangular or square profile. A third one of these lifters may then be mounted proximate a vertex of this profile between the adjacent edges.

In a preferred embodiment, the suction plate is composed of a plurality of adjacent suction modules, each module providing a portion of the perforated suction lifting surface. The airflow suction system may be configured to convey vacuum air pressure to each of these portions via corresponding control valves, the control system being configured to control the operation of the valves to individually control the vacuum air pressure provided to each of the suction lifting surface portions.

The portions of the perforated suction lifting surface may include a proximal set of portions relatively closer to one of the suction lifters and a distal set relatively further away from this suction lifter. The control system may then be configured to sequence the operation of the valves to provide the vacuum air pressure to this proximal portion prior to this distal portion following the initial plucking of the local area.

Also described herein is a method of using a vacuum plate lifting system for lifting sheet material articles, the vacuum plate lifting system comprising:

at least one suction lifter proximate an edge of the suction plate, said suction lifter comprising a downwardly oriented suction cup, said cup being movably mounted in a substantially vertical direction relative to the suction plate and being connected to a source of air pressure for providing air suction to said cup for plucking upwards a local area of said of articles to be lifted;

a suction cup actuation system configured to drive said movement of the suction cup between a raised orientation in which the suction cup is raised relative to a level of said suction lifting surface and a lowered orientation in which the suction cup is substantially at or below the level of said suction lifting surface whereby, in use, said air suction is directed substantially downwardly towards a sheet material article to be lifted when said suction cup is in the lowered orientation;

wherein the method comprises the steps of:

using a control system to control the movement of said suction cup by the suction cup lifting system to place said suction cup in the lowered orientation;

using the control system to control the movement of a vacuum lifter apparatus by a lifter actuation system to position the suction lifting surface over a sheet material article to be lifted;

with the suction cup in the lowered orientation and the suction lifting surface over said sheet material article to be lifted, applying said air suction to said cup to pluck upwards a local area of said of said article to be lifted;

with said local area being lifted, using an airflow suction system to convey vacuum air pressure to a perforated suction lifting surface to lift the remainder of said article to said suction lifting surface.

The method may further comprise the step of using the control system to control the movement of the suction cup by the suction cup lifting system to place the suction cup in the raised orientation once the airflow suction system is being used or is about to be used to convey vacuum air pressure to the perforated suction lifting surface to lift the remainder of the article.

The method may further comprise using the control system to control the operation of valves to individually control the vacuum air pressure provided to each of several portions of the perforated suction lifting surface during lifting of the remainder of said article to said suction lifting surface.

The control system may be configured to sequence the operation of the valves to provide vacuum air pressure to a portion of the suction lifting surface relatively closer to said suction cup prior to providing vacuum air pressure to another portion of the suction lifting surface relatively farther away from the suction cup.

Also described herein is a vacuum lifter apparatus for lifting sheet material articles, comprising an upper chassis joined to a substantially planar lower suction plate and an airflow suction system for conveying vacuum air pressure to the suction plate, wherein:

the suction plate comprises a plurality of suction plate modules, each of said modules comprising a housing with a substantially hollow interior and each of said housings being located laterally adjacent at least one other of said housings;

each of said housings comprises a lower plate, an upper plate and at least one side plate, each housing being affixed to said laterally adjacent housing along a seam between adjoining pairs of side plates;

said upper plates each comprise at least one opening and said lower plates are each perforated with a plurality of orifices through which, in use, air is drawn along airflow paths through said interior and out of said opening by the airflow suction system to provide, in use, on a lower side of the suction plate a substantially planar suction lifting surface for applying a suction lifting pressure to an upper surface of said sheet material articles to be lifted;

said upper plates together provide an upper side of the suction plate, the upper side of the suction plate being affixed to the chassis at each one of said housings.

Each suction plate module is therefore directly supported by the chassis.

The upper and lower plates are preferably secured spaced apart and fixed together within the housing interior by a reinforcing structure that extends between the lower and upper plates.

The reinforcing structure may be sandwiched between a lower tray and an upper lid. In a preferred embodiment, the tray and lid may each be of a metallic material. Other suitable materials may alternatively be used, for example moulded plastic materials or composite fibre-reinforced materials.

The tray may provide the lower plate and the lid may provide the upper plate.

Preferably, the side plates each comprise adjoining first and second members, the first member extending upwards from an edge of the corresponding lower plate along a fold in the material of the tray and the second member extending downwards from an edge of the corresponding upper plate along a fold in the material of the lid.

The reinforcing structure is preferably sandwiched between the lower tray and the upper lid.

The lower plate will, in general, have a periphery. The tray may comprise around this periphery an up-turned lip.

The upper plate will, in general, have a periphery. The lid may comprise around this periphery a down-turned lip.

In a preferred embodiment, the lip of the lid inter-engages with the lip of the tray, these lips being bonded together, for example by an adhesive, around said peripheries of the lower and upper plates.

The reinforcing structure is preferably an open-cell structure extending between the lower and upper plates and providing a plurality of channels for air drawn through said orifices to flow to the, or each, opening in the upper plate.

The open-cell structure is most preferably a honeycomb structure comprising a plurality of honeycomb cells. The cells are bounded by walls that extend between the upper and lower plates to provide vertical air flow paths, where these intersect with openings in one or both plates, and walls between adjacent cells having at least one hole therethrough to provide lateral air flow paths.

The upper and lower ends of the cell walls are most preferably bonded, for example by means of an adhesive, to, respectively, the upper and lower plates.

The airflow suction system preferably comprises a plurality of airflow channels, each airflow channel extending through the chassis from an air inlet to an air outlet. The air outlets are preferably connected to a source of vacuum pressure and the air inlets are preferably configured to receive the air drawn along airflow paths.

Preferably, different ones of the air inlets are configured to receive air from different ones or different groupings of the suction plate modules.

The suction lifting surface may comprise a plurality of individually controllable sections, each section comprising at least one of the suction plate modules.

The airflow suction system may comprise a control system and a plurality of airflow control valves, each of these valves being associated with one of the sections of the suction lifting surface and the control system may be configured to control the operation of the valves so that the airflow to said sections is individually controllable by the control system.

In a preferred embodiment, the upper, lower and side plates may each be of a metallic material. Other suitable materials may alternatively be used, for example moulded plastic materials or composite fibre-reinforced materials. At least one of the adjoining pairs of side plates may comprise a member that extends upwards from an edge of the corresponding lower plate along a fold in the material to provide an upwardly folded side plate member.

The folded side plate member may extend upwards beyond a plane define defined by the corresponding upper plate to present a tab. In a preferred embodiment, a pair of opposed tabs are bonded together to form a flange. This tab or flange may then be affixed to the chassis, preferably the lower side of the chassis.

The lower side of each suction plate module is therefore directly supported by the chassis by the tabs.

The lower side of the chassis may have at least one downwardly facing slot. The, or each tab may then be affixed to the chassis within the slot.

Preferably, at least one pair of adjacent housings comprise a pair of adjoining tabs, said adjoining tabs both being affixed to the chassis within a common one of said slots.

In this way, the weight of the corresponding housing including the weight of a lifted article is at least partially transmitted to the chassis via the tabs.

Also described herein is a vacuum lifter apparatus for lifting sheet material articles, comprising an upper chassis and a lower suction plate, the upper chassis having at least one air outlet for conveying vacuum pressure to the suction plate along a plurality of air flow paths through the chassis and suction plate to provide suction lifting pressure to an upper surface of said articles to be lifted, wherein:

the suction plate comprises a lower side and an upper side, the suction plate having a substantially hollow interior between said lower and upper sides, the upper side of the suction plate being affixed to the chassis, and the suction plate lower side providing a downwardly oriented planar suction lifting surface for making contact with the upper surface of said articles, and said suction lifting surface comprises a plurality of laterally adjacent portions, each of said portions comprising a plurality of orifices through which, in use, air is drawn along said airflow paths to provide a suction lifting pressure; and the chassis is separated at intervals from the suction plate upper side to provide a plurality of air chambers between the chassis and suction plate, each air chamber being configured to convey said vacuum pressure to a corresponding one of said portions; and each of said portions of the suction plate has a laterally extending portion that extends laterally away from a corresponding one of said air chambers, and the substantially hollow interior of the suction plate providing lateral airflow whereby suction lifting pressure is provided to said laterally extending portions from each corresponding air chamber.

The suction plate is most preferably composed of a plurality of adjacent suction modules. Each suction module may comprise a housing, the housing comprising opposite top and bottom walls. The bottom walls together provide the lower side of the suction plate and the top walls each have at least one air outlet leading into a corresponding one of the air chambers. The bottom walls are each perforated to provide the orifices and through which, in use, air is drawn along the air flow paths through the top wall outlets and into the chambers towards the, or each air outlet of the chassis, to provide the suction lifting pressure.

For each of the suction lifting surface portions there is, in a preferred embodiment, just one suction module. The, or each, air outlet of each top wall may then lead into a corresponding one of the air chambers.

At least one air flow control valve may be provided along at least one of the air flow paths in order to control the suction lifting pressure to the suction modules.

Preferably, for each chamber, an air-tight seal is provided between the upper side of the suction plate and the chassis. This air-tight seal is most preferably provided around each chamber where the upper side of the suction plate is affixed to the chassis.

Each of said housings may comprise a substantially hollow interior bounded by opposite top and bottom walls.

Each of the housings may comprise a lower plate, an upper plate and at least one side plate, and each one of the housings may be affixed to a laterally adjacent another one of said housings along a seam between adjoining pairs of side plates.

The vacuum lifter apparatus may further comprise an airflow suction system for conveying vacuum air pressure to the suction plate, the airflow suction system comprising a source of vacuum air pressure to which the air outlet is connected.

There may be, associated with each one of the air chambers, an airflow control valve for controlling the volume of air drawn along the airflow paths.

Also described herein is a vacuum lifter apparatus for lifting sheet material articles, comprising an upper chassis, a modular lower suction plate supported beneath the chassis, a controller and a source of vacuum air pressure, the suction plate comprising a suction lifting surface for providing vacuum lifting pressure to said articles, wherein:

the modular suction plate has a plurality of side-by-side modules, each module providing a different portion of the suction lifting surface and having one or more air outlets, said outlets of one module being separate from said outlets of other modules and being in fluid communication with the corresponding portion of the suction lifting surface and not with different portions of the suction lifting surface;

the chassis comprises at least one air outlet connected to said source of vacuum air pressure for conveying said vacuum pressure to the suction lifting surface of the suction plate, and a plurality of separate air flow channels through the chassis, each of said channels leading from said outlets of one of said modules to said outlet of the chassis; and said apparatus further comprises for each air flow channel an associated air flow valve and a valve actuator; the controller being operatively connected said valves, and the controller being configured, in use, to open and close said valves to separately control the vacuum pressure transmitted along said channels to each one of said modules whereby the vacuum pressure conveyed to each one of said different portions of the suction lifting surface is individually controllable by the controller.

The portions of the suction lifting surface may be arranged in an array. The controller may be configured to sequence opening of the valves to convey the vacuum pressure to the suction lifting surface portions at different times such that vacuum pressure appears at a first one of these portions first and a second one of these portions last, and the first and second portions being on opposite sides of the array of suction lifting surface portions.

There is preferably at least one intervening portion of the suction lifting surface between the first and second portions. The controller may then be configured to sequence the opening of the valves to convey the vacuum pressure to the intervening portions sequentially in time such that such that the conveyed pressure appears as a wave spreading across the suction lifting surface starting at the first portion and ending at the second portion.

The chassis may be separated at intervals from the suction plate upper side to provide a plurality of air chambers between the chassis and suction plate, each air flow channel extending through one of the chambers.

Each suction module preferably comprises a housing, the housing comprising opposite top and bottom walls. The bottom walls together provide a lower side of the suction plate and the top walls each provide the outlets of the modules.

The bottom walls may each be perforated to provide orifices through which, in use, air is drawn along air flow paths through the top wall outlets and into the channels towards the air outlet of the chassis to provide the suction lifting pressure.

BRIEF DESCRIPTION OF THE DRAWINGS

The invention will now be further described, by way of example only, and with reference to the accompanying drawings, in which.

DETAILED DESCRIPTION

Figure 1:
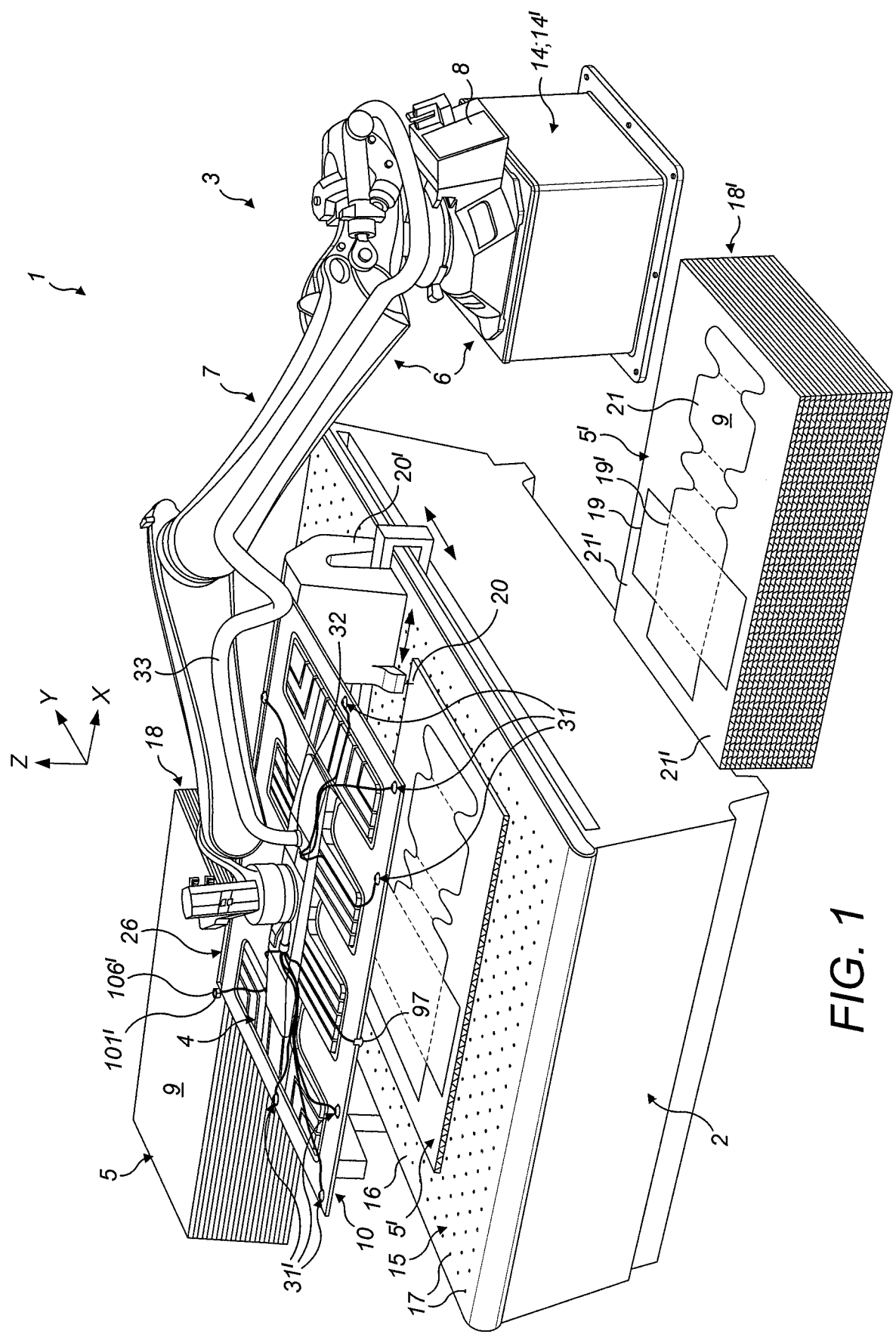
FIG. 1 is a perspective view of a sheet material cutting work station and a vacuum plate lifting system according to a preferred embodiment of the invention, the lifting system comprising a vacuum lifter apparatus for lifting and depositing sheet material articles, a sheet material lifter actuation system configured to raise, lower and move the vacuum lifter apparatus and a control system configured to control the operation of the vacuum lifter apparatus and actuation system during use.

FIG. 1 shows a sheet material processing apparatus 1, comprising a sheet material cutting work station 2 and a vacuum plate lifting system 3. The vacuum plate lifting system comprises a vacuum lifter apparatus 4 for lifting and depositing sheet material articles 5, in this example rectangular cardboard sheets, and a sheet material lifter actuation system 6, which in this example includes a five-axis robotic arm 7 configured to raise, lower and move the vacuum lifter apparatus 4 whilst keeping it level. The lifter actuation system 6 also comprises a control system 8 configured to control the operation of the vacuum lifter apparatus and lifter actuation system.

The mechanical details of the robotic arm 7, and the general way in which it may be controlled by the controller 8 to move above five axes, are not central to the invention, and will also be familiar to those skilled in the art, and so will not be further described in detail.

Figure 2:
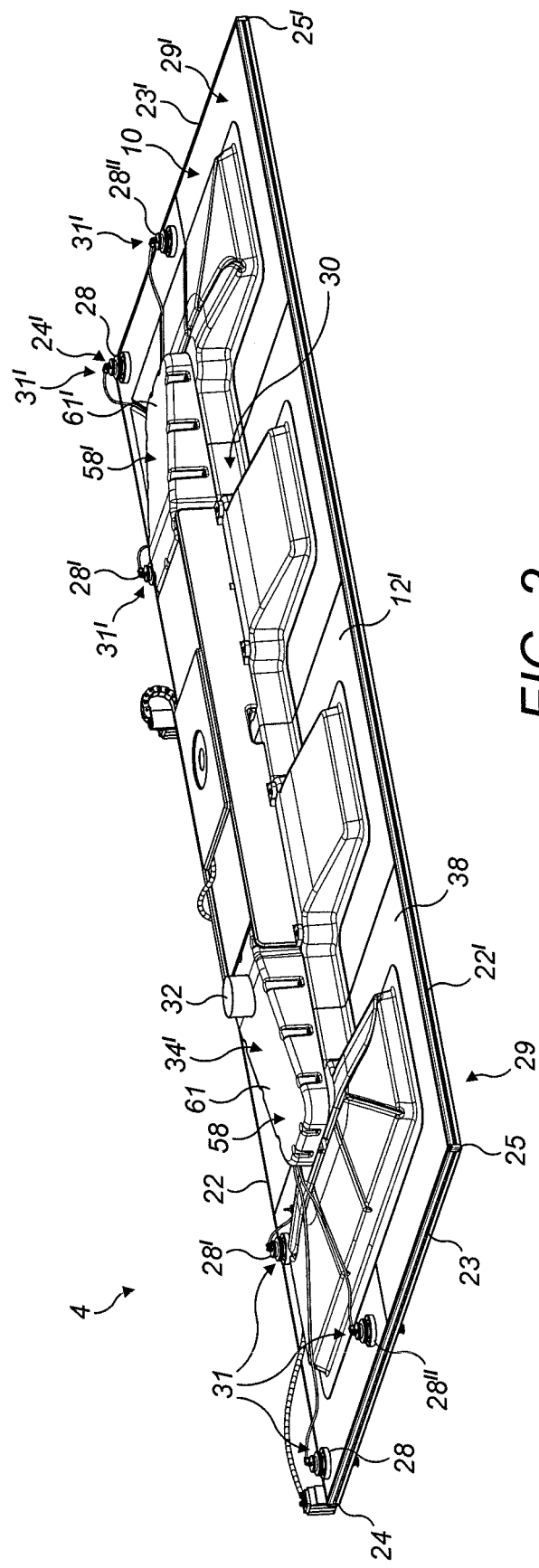
FIG. 2 is a perspective view of the vacuum lifter apparatus of FIG. 1, showing how this is comprised of an upper chassis joined to a substantially planar lower suction plate composed of a plurality of adjacent suction modules.
Figure 3:
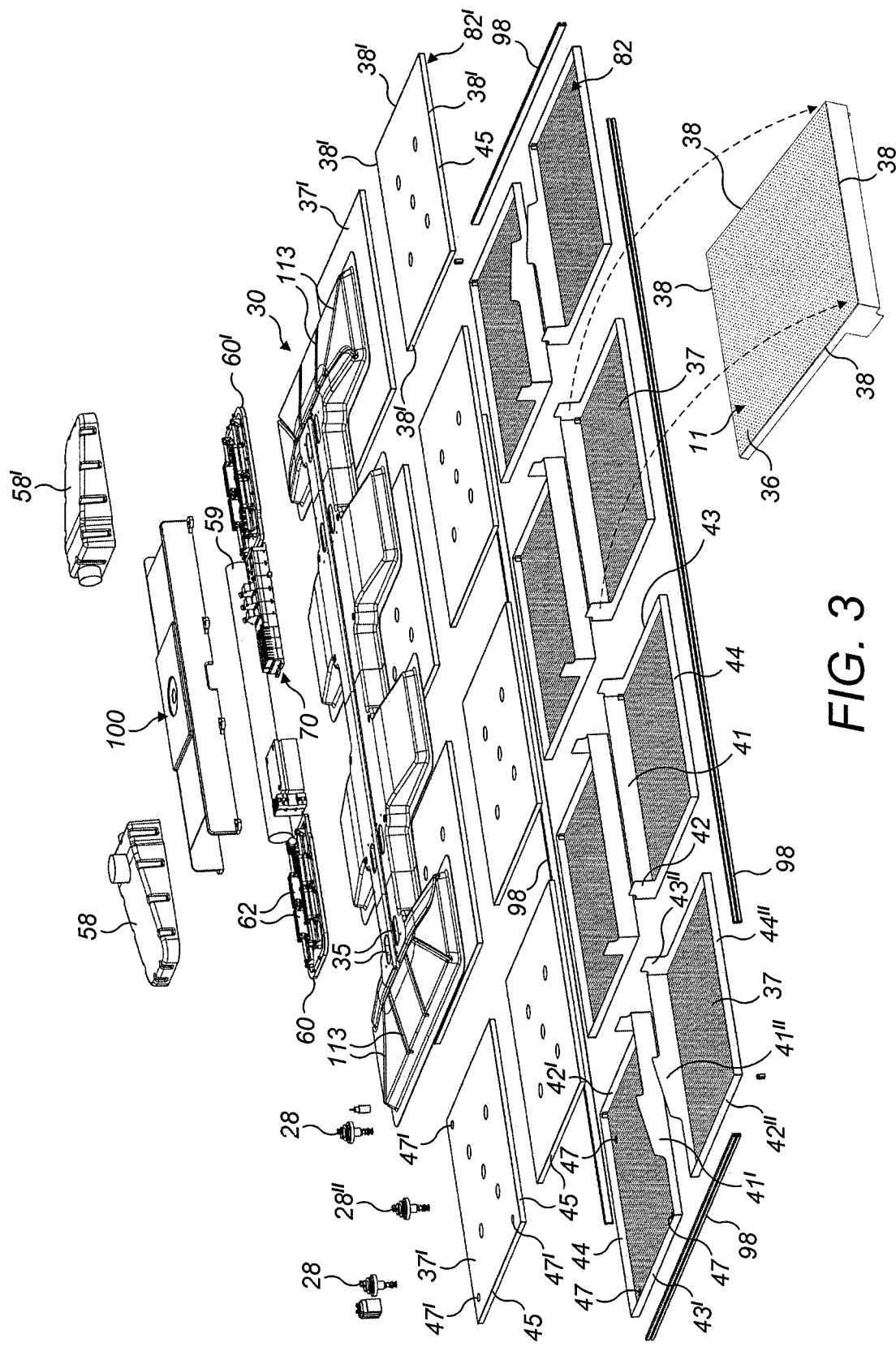
FIG. 3 is an exploded view of the vacuum lifter apparatus of FIG. 2, showing the how the suction plate comprises eight suction modules and how the chassis has an elongate central spine from which eight lobes extend transversely, each lobe overlapping just one of the modules.
Figure 4:
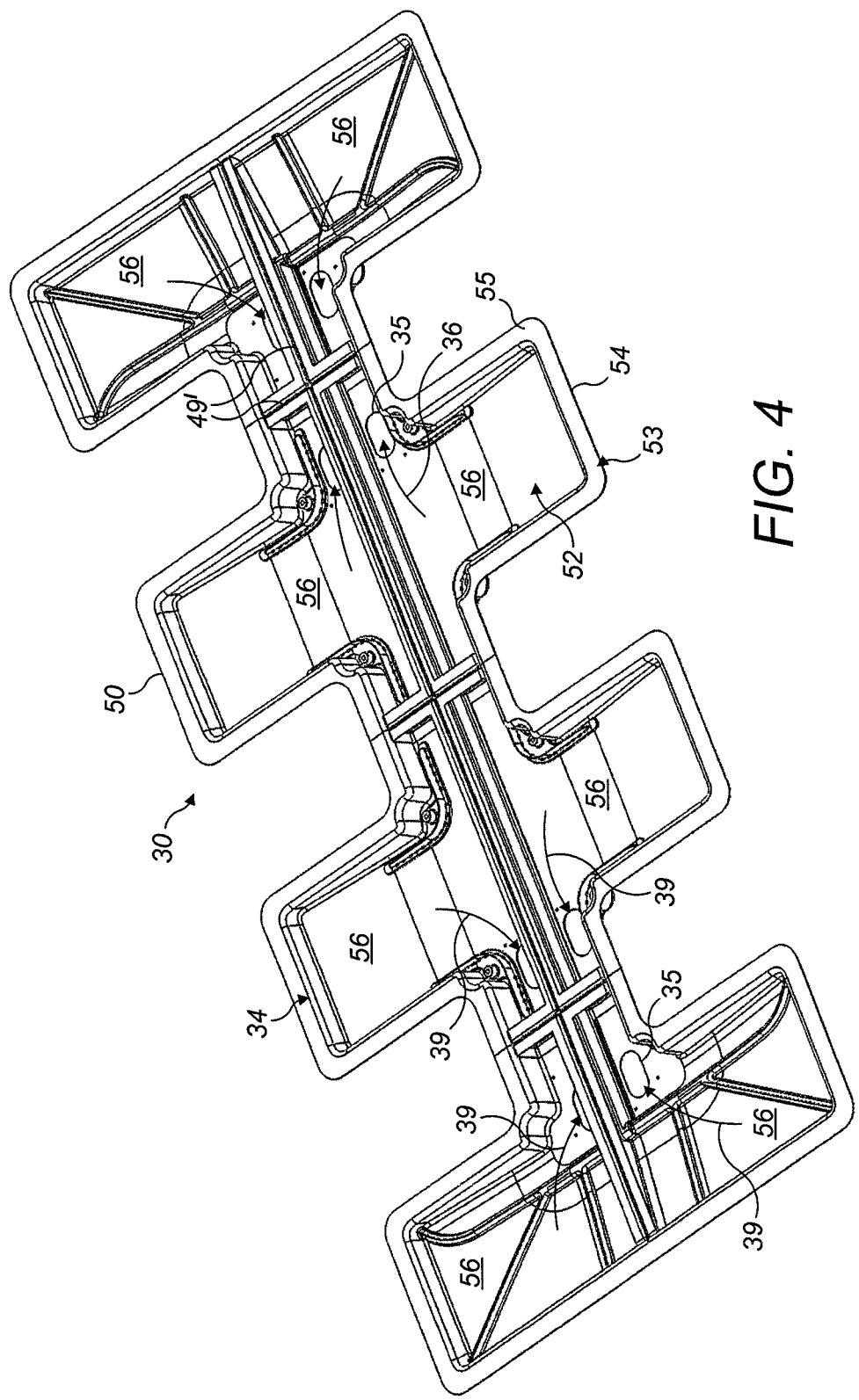
FIG. 4 is a perspective view of the underside of the chassis of FIG. 3, showing how each chassis lobe has a hollow, generally arched interior providing a corresponding recess, each recess being partitioned from adjacent recesses by a dividing wall that extends the length of the central spine and by three transverse branches between longitudinally adjacent pairs of lobes so that each recess provides a corresponding chamber when the chassis is affixed to the suction plate, each chamber having a valve aperture in an upper wall of a main chassis housing.
Figure 5:
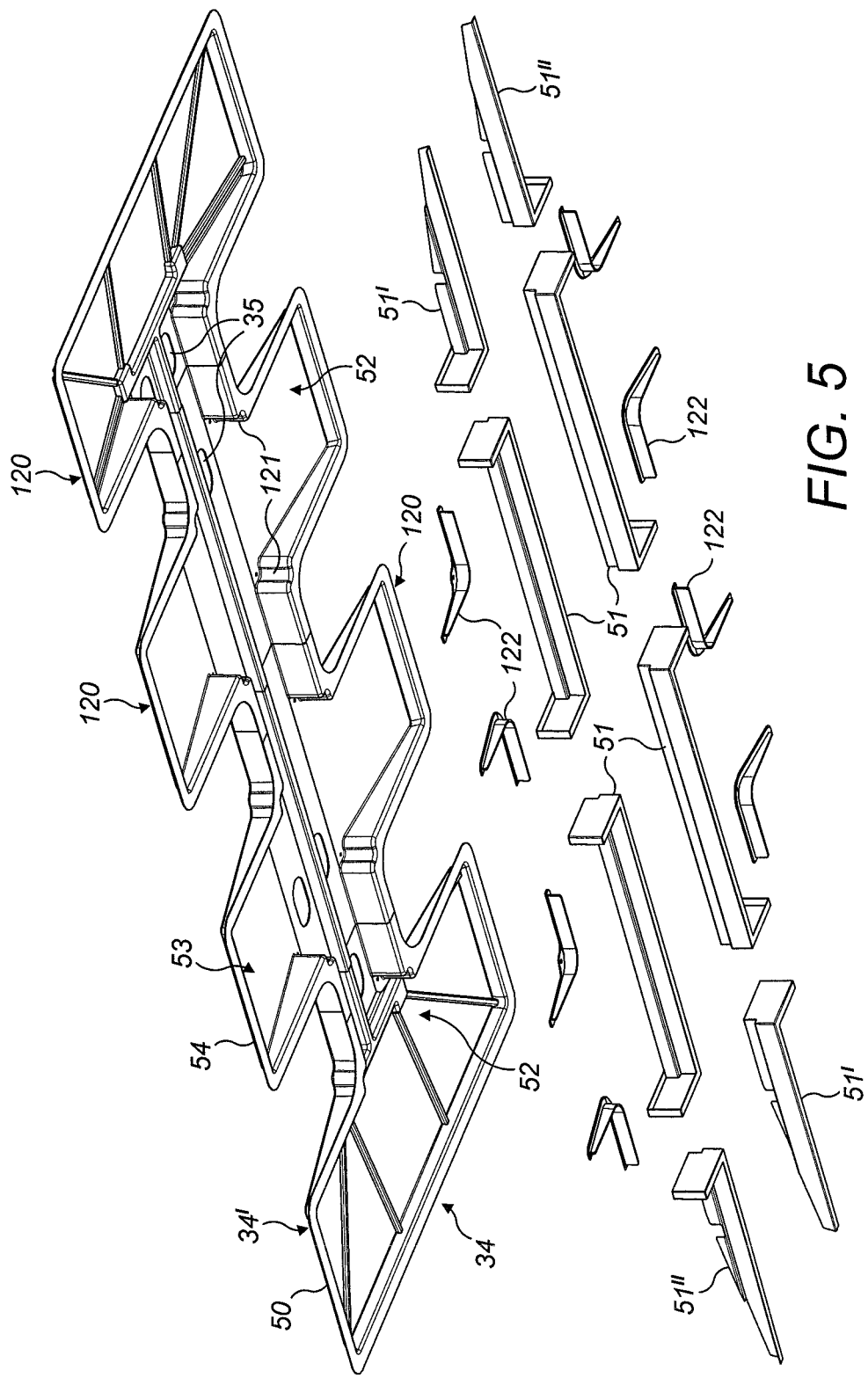
FIG. 5 is an exploded view from underneath of the chassis of FIG. 3, showing the main chassis housing, the components used to form the dividing wall and eight corner brackets used to reinforce base corners of each of the lobes.
Figure 6:
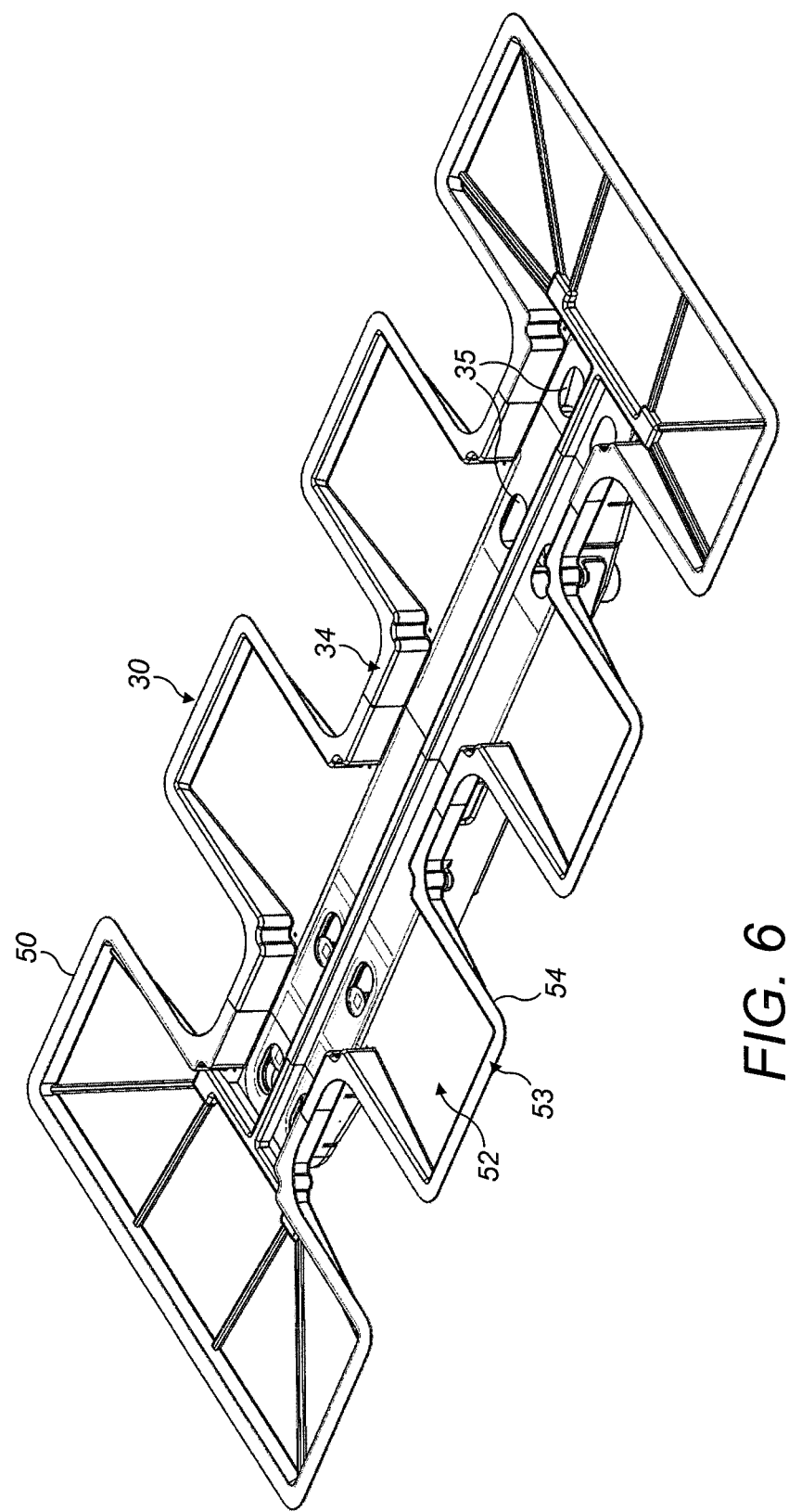
FIG. 6 is a view of the underside of the main chassis housing of FIG. 5 and components affixed to an upper side of the main chassis housing upper wall, including eight valve mechanisms and a central mounting portion of the chassis by which the vacuum lifter apparatus is attached to the end of a robot arm of the lifter actuation system.

In this example, the sheets are moved between three locations by the lifting system 3. Blank sheets or "blanks" 5 are initially stacked to one side of the work station 2. The lifter actuation system 4, shown in more detail in FIG. 2, has a substantially planar suction plate 10 which is maintained in a substantially horizontal or level orientation while being moved forwards or backwards along orthogonal horizontal X- and Y-axes and upwards or downwards along a vertical Z-axis. As shown in FIGS. 15, 17, 23 and 25, the suction plate 10 has on a lower side 29 a substantially planar downwardly orientated suction lifting surface 11 provided by a lower wall 12 perforated by an array of holes or orifices 13. As will be explained in detail below, the holes are connected to an airflow suction system for conveying vacuum air pressure to the perforated suction lifting surface including a source of negative, or vacuum, air pressure 14 for attracting, making contact with and holding an upper surface 9 of a sheet material article to the suction lifting surface. The operation of the lifter actuation system 4, the robotic arm 7 and source of vacuum pressure 14 is controlled by the controller 8.

In this example, the work station 2 is an automated cutting table, such as that supplied by supplied by Esko-Graphics bvba under the brand name "Kongsberg Automate" (Trade Mark). The automated cutting table 2 has a fixed cutting surface 15 provided by a rectangular table top or plate 16 perforated by an array of holes 17 connected to a controllable source of vacuum pressure (not shown) to provide a vacuum hold-down. In this way, the table can securely hold down and release any sheet material placed on the table surface 15. The principles of the invention do not, however, require use of any particular type of work station or the use of a vacuum hold down on the surface where sheet material articles are deposited which could, for example, simply be a stack of similar articles.

In this example, however, sheet material articles are lifted by the suction plate of the vacuum lifter apparatus one at a time from an input stack 18 of fresh uncut sheets 5 onto the cutting surface 15, and then after cutting along cut lines 19 and scoring along fold lines 19' (indicated schematically by dashes) by a movable blade 20 and scoring wheel (not shown), are lifted, moved and deposited by the apparatus plate onto an output stack 18' of processed sheets 5'. The blade 20 is a reciprocating vertical blade driven by a cutting head 20' that is movably mounted on a rail such that the blade can be moved in X- and Y-directions. Other types of cutters may, however, be used, depending mainly on the material to be cut. The blade will normally be surrounded by a cylindrical shield—this is omitted from the drawings so that the blade can be seen. The score lines, or crease lines 19', may optionally be formed in a similar manner by a scoring wheel mounted to the actuator, to facilitate folding of the cardboard material.

In this example, the processed sheets have a central portion providing useful material 21 for a folded cardboard box and a peripheral portion which is waste material 21'.

In FIG. 1, cutting and creasing operations have just been completed for one cardboard sheet 5' on the table cutting surface 15. The robotic arm 7 is shown in the process of moving into position to lift this processed sheet off the table surface and onto the output stack 18'.

The suction plate 10 is rectangular, with opposite first and second long edges 22, 22' and opposite first and second short edges 23, 23', and four corresponding corners or vertices 24, 24', 25, 25' between adjacent long and short edges.

In addition to the suction plate 10, the lifter actuation system 4 comprises six suction lifters 28, 28', 28" proximate three of the four suction plate edges, specifically along the first long edge 22 and along the adjacent first and second short edges 23, 23'. These six suction lifters are arranged in two groups 31, 31' of three suction lifters in proximity with one another, a first one of these groups 31 having a first suction lifter 28 proximate a first vertex 24 and the other of these groups 31' having a first suction lifter 28 proximate a second vertex 24'. The other two suction lifters of each group have a second suction lifter 28' positioned proximate the first long edge 22, and a third suction lifter 28" positioned proximate either the first or the second short edge 23, 23', in each case equidistantly from the corresponding vertex such that the three suction lifters 28, 28', 28" in each group are located on the vertices of an equilateral triangle. As will be explained below, the benefit of this arrangement is that it facilitates the initial plucking of one or two corners of a sheet to be lifted prior to lifting of the entire sheet by the suction lifting surface 11.

The lifter actuation system 4 further comprises along the second long edge 22" an elongate bar 26 that is movably mounted along the second long edge 22' of the suction plate 10 between third and fourth corners or vertices of the suction plate. The elongate bar is omitted in FIG. 2, but is shown in more detail in FIGS. 25 and 26. The bar 26 comprises a series of nozzles 27 connected to the source of negative air pressure 14 (also called "vacuum pressure") for providing a vacuum suction into the nozzles. The movable elongate bar will be described in greater detail below.

Reference is now made to FIGS. 2 to 5, which show various views of the main structural components of the vacuum lifter apparatus 4. An upper side 29' of the substantially planar lower suction plate 10 is affixed to a lower side 34 of a chassis 30. The suction plate is therefore supported beneath the upper chassis.

The chassis 30 has a centrally located mounting portion, comprising a mounting bracket 100 to which a manipulating end of the robotic arm 7 is connected. The chassis is also affixed substantially centrally with respect to the centre of gravity of the suction plate 10 The vacuum lifter apparatus 4 is therefore substantially balanced about its midpoint.

An upper side 34' of the chassis 30 has an air outlet 32 for connection to the airflow suction system, for example by a flexible hose 33 as shown in FIG. 1, to the source of vacuum pressure 14. The air outlet 32 conveys to the suction plate 10 vacuum pressure through a plurality of valve apertures 35 in an upper wall 115 of a chassis housing 50 along a plurality of air flow paths or channels 39 that extend through the chassis and suction plate to provide suction lifting pressure to the upper surface 9 of the articles 5 to be lifted. In this example, the air channels 39 are provided between an upper wall 12' of the vacuum plate and the upper wall 115 of the chassis housing 50.

The suction lifting surface comprises a plurality of laterally adjacent portions 36. In this example, as shown most clearly in FIG. 3, there are eight such portions.

These portions are modular in form, i.e. being adapted to be fitted together into a whole. Each suction plate lifting surface portion 36 is provided by a metallic lower plate 37 of a corresponding suction plate module 40, 40', 40". The modules are square in outline and arranged in a two by four array such that four modules make up each of the suction plate long sides 22, 22' and two of the modules make up each of the suction plate short sides 23, 23'.

When joined together, the lower plates 37 provide the lower wall 12 of the suction plate 10. Each module has a metallic upper plate 37', which is parallel to, and spaced apart from the lower plate 37. When joined together, the upper plates 37' provide the upper wall 12' of the suction plate 10. The upper and lower plates each have a square outline, each being bounded by four edges 38, 38'.

Each upper plate 37' has around its edges 38' four similar metallic members 45 each of which is a folded extension of the upper plate, extending downwards along a fold line 46' in the metallic material from a corresponding edge 38' to provide an inner side plate member for the module.

There are three varieties of module 40, 40', 40", depending on their location in the suction plate 10 and the way each module is affixed to the chassis 30. Specifically, there are four similar suction plate modules 40 arranged in a two-by-two array in a main, central portion of the suction plate 10, and four suction plate modules of different handedness 40', 40" at the corners 24, 24', 25, 25' of the suction plate 10.

The main differences between the modules, apart from lower and upper clearance apertures 47, 47' for the two groups 31, 31' of suction lifters in, respectively, the lower and upper plates 37, 37', are in the shape of four side plate members 41-44, 41'-44', 41"-44" each of which extends upwards along a fold line 46 in the metallic material from a corresponding edge 38 to provide an outer side plate member for the module. In addition, in each module, two or three of the side plate members extend upwards above the upper plate 37' to present tabs 48. Each tab 48 abuts similar tabs 48 from side plate member extensions of an adjacent module and when joined together these tabs form corresponding flanges 49 which slot into corresponding slots 49' provided on the lower side 34 of the chassis 30.

A particular advantage of the tabs 48 is that these are an example of an upwards extension of the lower plate of each one of the suction plate modules. Because these extensions are joined directly to the upper chassis, the weight borne by the suction plate is directly conveyed to the chassis at least in part by material contiguous with the lower plate. This is a very strong form of construction—the upper chassis and lower plate form an overall monocoque chassis. A monocoque chassis is a structure which integrates body (e.g. vacuum plate) and chassis (e.g. upper chassis) together to form a composite structure which has better stiffness as well as weight advantage. In a monocoque chassis the stress generated during lifting or motion is distributed among the structure and does not form localised stress which would result in deformation. The structure allows for a lighter structure (in this example typically about 80 kg to 90 kg) to have greater strength, which provides a significant advantage in terms of robotic actuators, which become increasingly expensive, or alternatively slow, when the weight to be borne at by the robot arm exceeds about 100 kg.

The slots 49' are provided by parallel gaps between opposed pairs of brackets of which there are three types, 51, 51', 51", bonded to a lower substantially concave lower side 52 of the main housing or body 50 of the chassis. The brackets 51, 51', 51" together with engagement of the flanges in slots, form longitudinal and transverse walls which provide transverse air pressure isolation of one void or air chamber 56 above each suction plate module from a corresponding void or air chamber 56 of an adjacent suction plate module.

When the lower and upper plates 37, 37' are brought together, the inner side plate members 45 make a close sliding fit inside the outer side plate members 41-44, 41'-44', 41"-44". It is preferred if mating side plate members, including abutting upwards extensions, are bonded together by adhesive to form the suction plate 10, although other means, for example rivets or clinch joins may be used instead of, or in addition to, adhesive.

The suction plate, once formed, is then secured to the lower side 34 of the chassis 30 by slotting the flanges 49 into the slots 49'. It is preferred if mating flanges and slots are bonded together by adhesive. Other securing means may be used, either additionally or alternatively, for example bolts or rivets pinning the assembled flanges and slots. The concave lower side 52 of a main body 50 of the chassis is bounded by a continuous rim 53 which preferably is a lip that extends laterally outwards to a peripheral edge 54 of the chassis main body. The rim presents a downwardly facing surface 55 to the upper wall 12' of the suction plate. The rim downwardly facing surface lies in a plane, so that the rim can be secured to the suction plate upper wall, preferably by bonding using an adhesive, which also provides a peripheral air seal for the chambers 56. Other securing means for example rivets, may alternatively or additionally be used. When the chassis main body 50 and suction plate 10 are secured together in this way, the generally concave lower surface 52 of the lower side of the chassis main body 50 and opposite portions of the suction plate upper wall form the air chamber 56 above a corresponding one of the suction plate modules.

It is, however, most preferable if there is an air-tight seal provided between the rim 53 and the suction plate upper wall 12', and also between opposite sides of the joined flanges and brackets, so that each air chamber is isolated in terms of air pressure from adjacent air chambers and also the surrounding ambient air.

The chassis 30 is therefore separated at intervals from the suction plate upper side or wall 12' to provide the plurality of air chambers 56 between the chassis and suction plate. Each air chamber is also configured to convey the vacuum pressure to a corresponding one of the suction plate portions. In this example the upper plate of the suction plate module has a plurality of apertures or holes 13' therein, the air flow paths 39 extending from the holes 13 in the lower wall 12 of the suction plate 10 and through the holes 13' in the upper wall of the suction plate and into each chamber 56 and to the corresponding valve aperture 35.

Each suction lifting surface module has the same number and pattern of suction holes 13, apart from two to which the two groups 31, 31' of suction lifters are mounted, which are provided with corresponding clearance apertures 47, 47' in the lower and upper module plates 37, 37'. Each of the suction lifting surface portions comprises a different sub-set of the orifices 13 through which, in use, air is drawn along separated airflow paths to provide suction lifting pressure to each portion of the suction lifting surface.

Reference is now made to FIGS. 6 to 11. As mentioned above, the airflow suction system comprises at least one air outlet 32 for connection to the source of vacuum air pressure 14. In one aspect of the invention, between the, or each, outlet and the suction plate there is at least one airflow manifold, this manifold comprising a plurality of branched ends, and these ends being configured to convey the vacuum air pressure from the, or each, outlet to corresponding portions 36 of the suction plate. In the example described above, the air chambers 56 provide part of this manifold.

Another part of the manifold is provided by at least one valve manifold. In this example, there are two such valve manifolds 58, 58', each one having an inlet side with four of the valve apertures 35, and each one having an outlet side leading to the air outlet 32, either directly, in the case of a first valve manifold 58 or by a connecting pipe 59 in the case of a second valve manifold 58'.

The inlet side of each valve manifold is provided by corresponding first and second valve plates 60, 60'. The outlet side of each manifold is provided by corresponding first and second valve manifold covers 61, 61'.

Associated with each valve aperture 35 is a valve actuator 62, which in this example is pneumatic, although other type of valve motor could be used, for example electric or stepper motor actuators. The pneumatic supply to the valve actuator is via one of a set of electronically controlled control valves 70 located on the upper side 34' of the chassis 30. The control valves are controlled by the controller 8. For clarity, individual wires to the control valves 70 and individual pneumatic pipes are not illustrated, however such conventional connections will be apparent to those skilled in the art.

The valve actuator 62 drives a valve slider 63 which is movable to open and close the valve aperture 35. Each valve slider is mounted on an upstream face 64 of one of the valve plates, that is, the side of the plate facing into one of the corresponding air chambers 56. Each valve actuator is mounted on a downstream face 64' of one of the valve plates, that is, the side facing into the valve manifold.

Figure 11:
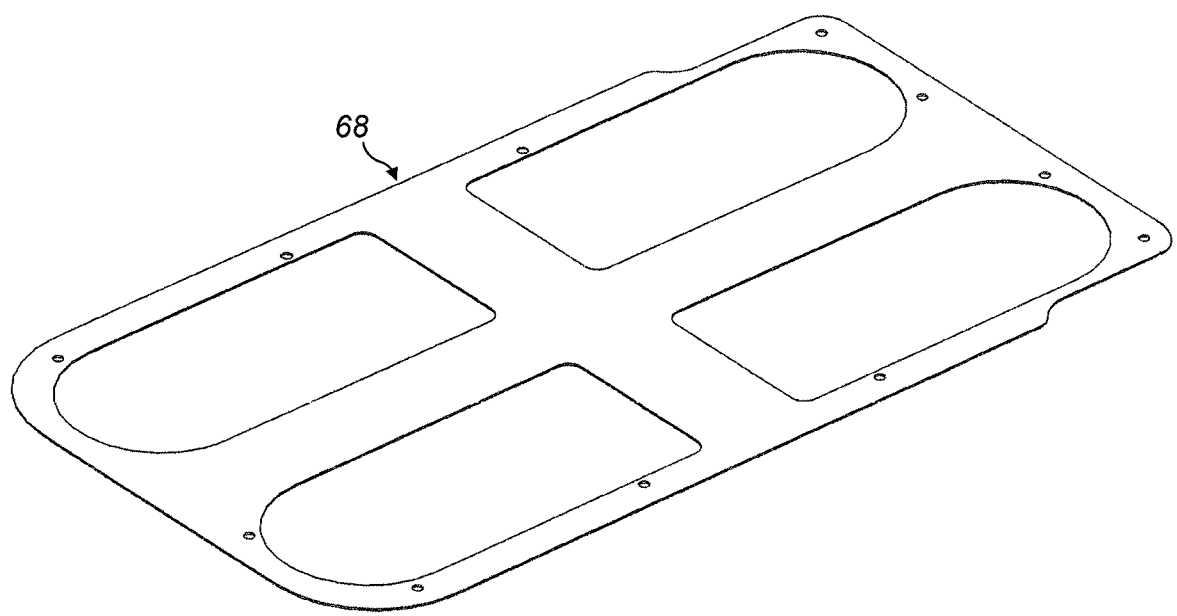
FIG. 11 shows a gasket which provides a seal between the underside of the common mounting plate around each one of the four valve seats, and an upper side of the main chassis housing upper wall.
Figure 12:
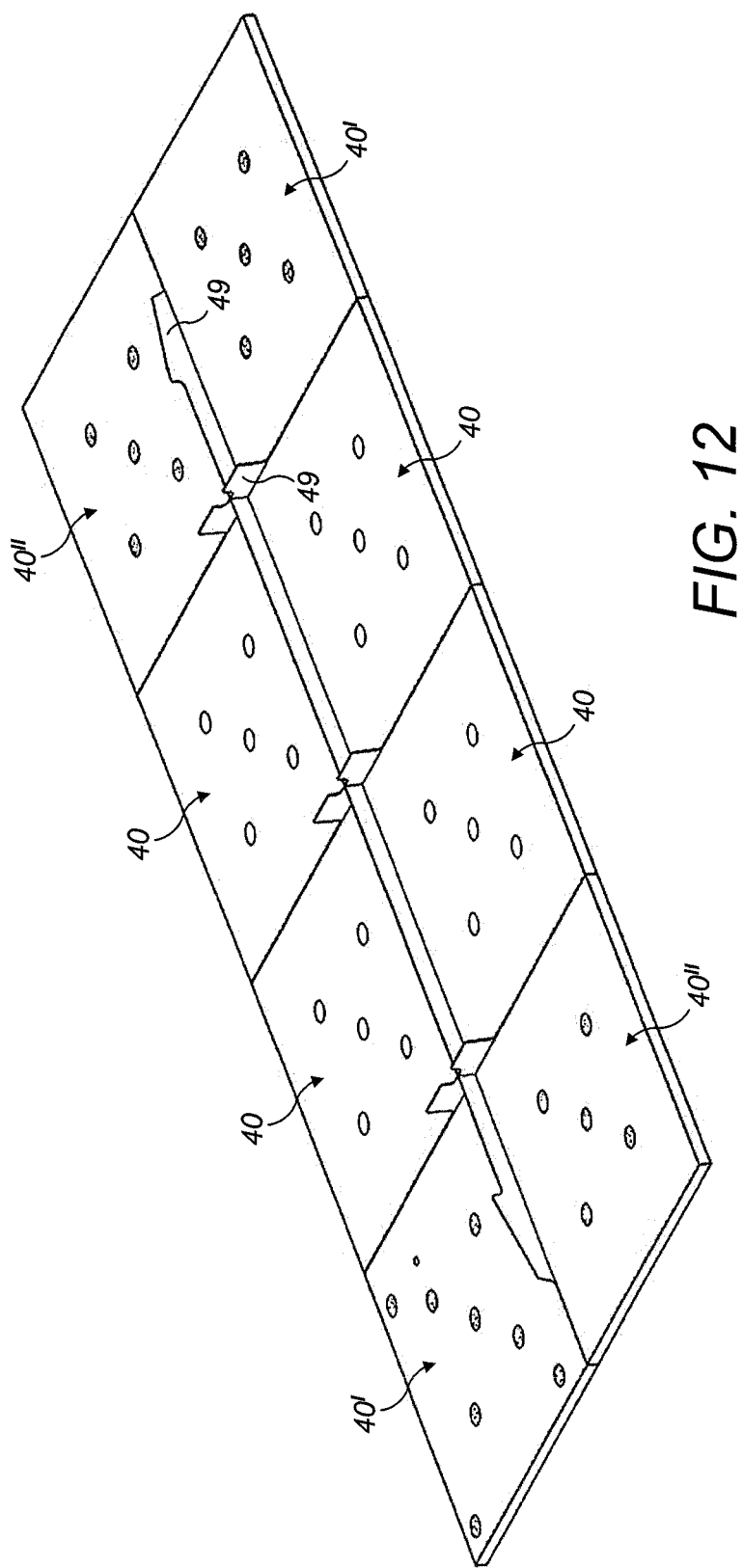
FIG. 12 is a view of the eight suction modules when joined together along vertically parallel seams which include upwardly extending tabs that insert into corresponding slots in the centre lines of the dividing wall, and showing how each module in an upper side has five air outlets through which air is drawn into a corresponding one of the recesses in the underside of the chassis.
Figure 13:
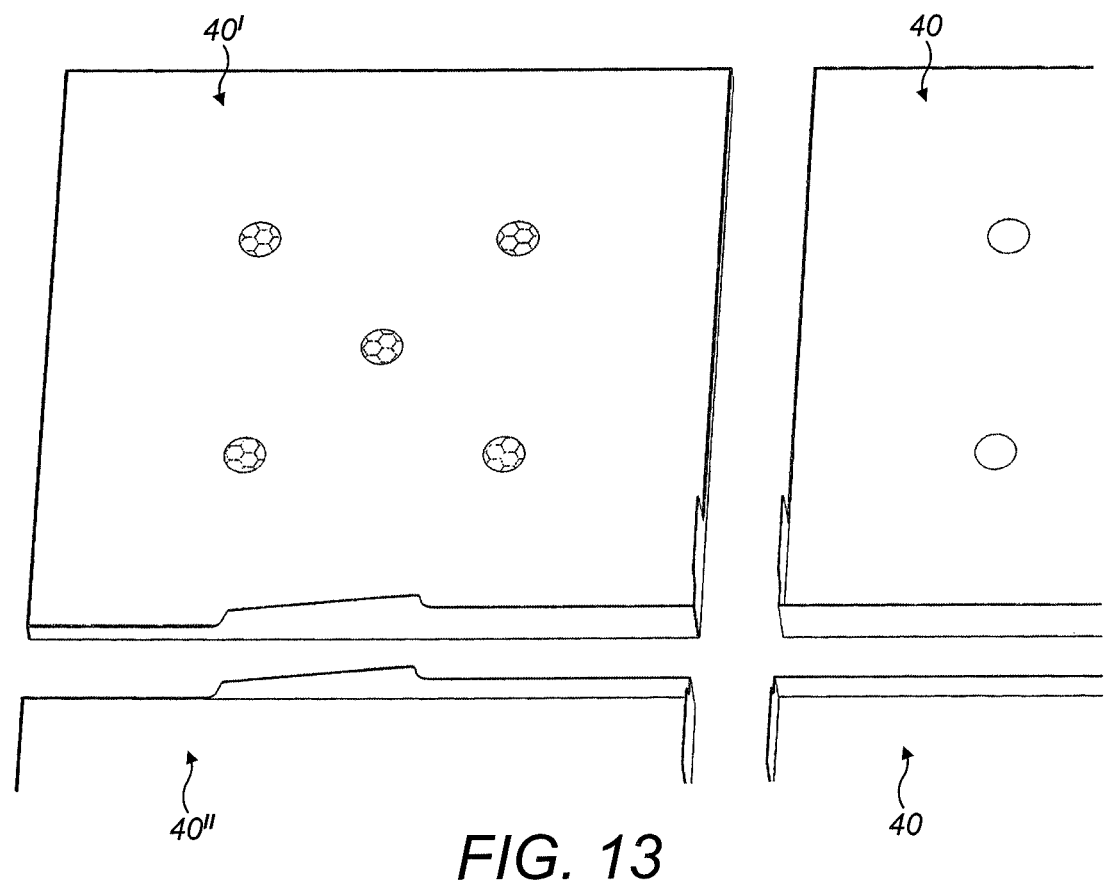
FIG. 13 is an enlarged view showing four adjacent modules of FIG. 12 prior to abutment and affixing along the vertically parallel seams.
Figure 14:
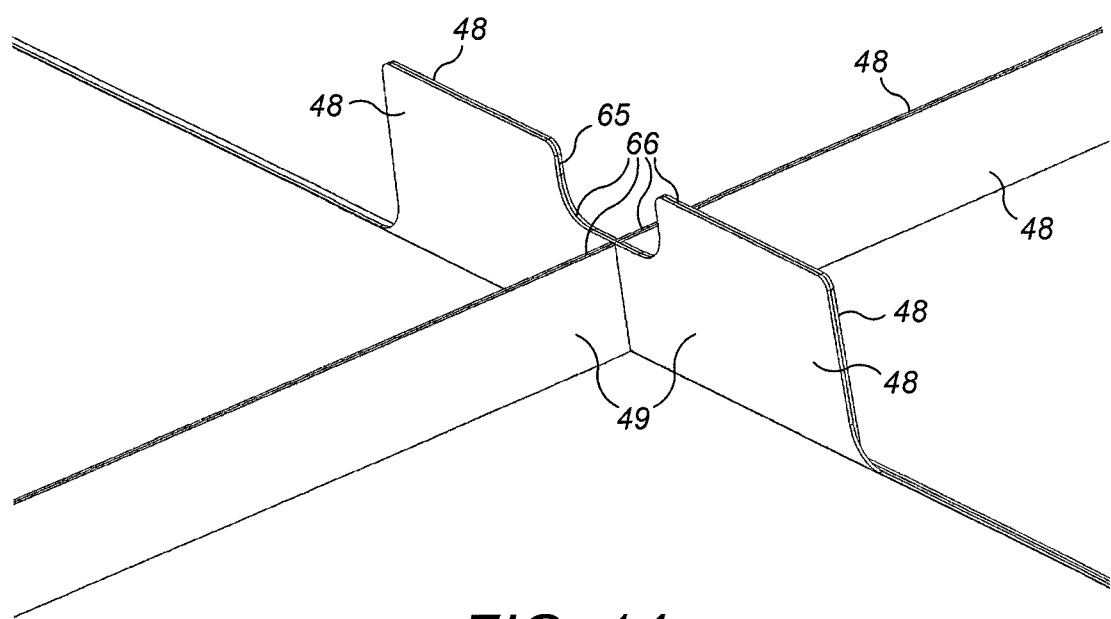
FIG. 14 is an enlarged view of the four adjacent modules of FIG. 13 after affixing.
Figure 15:
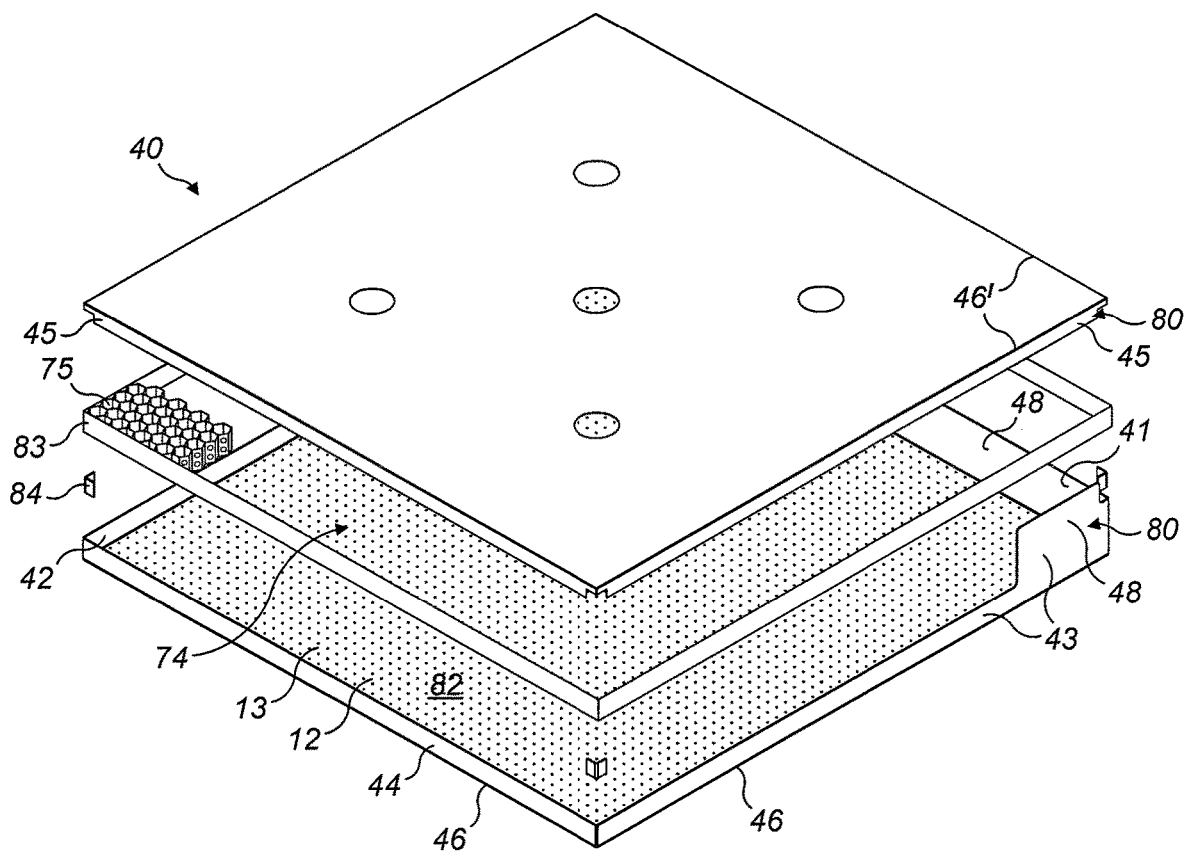
FIG. 15 is an exploded view of one of the suction modules, showing how this has a hollow housing comprising opposite top and bottom walls spanned across their full extent by a reinforcing honeycomb structure, only part of which is shown in FIG. 15 for clarity.

As shown in FIGS. 12 and 14, the flanges, which are held together by a layer of cured adhesive 65, cross at four cruciform junctions 66, two of which are centered directly beneath corresponding valve plates 60, 60' with one of the four valve apertures being located in one of the four quadrants around the junction. This is so that each valve controls the air flow from just one of the air chambers 56 and so that each of the valve plates 60, 60' spans a cruciform junction 66' of slots between brackets 51, 51' 52". An air seal is made around a peripheral region 67 of the upstream face of each valve plate and the main body 50 of the chassis to which the valve plate is bolted, by means of a gasket 68, as shown in FIG. 11.

The gasket also makes an air seal with the brackets 51, 51', 51" where these cross beneath the valve plate.

Figure 7:
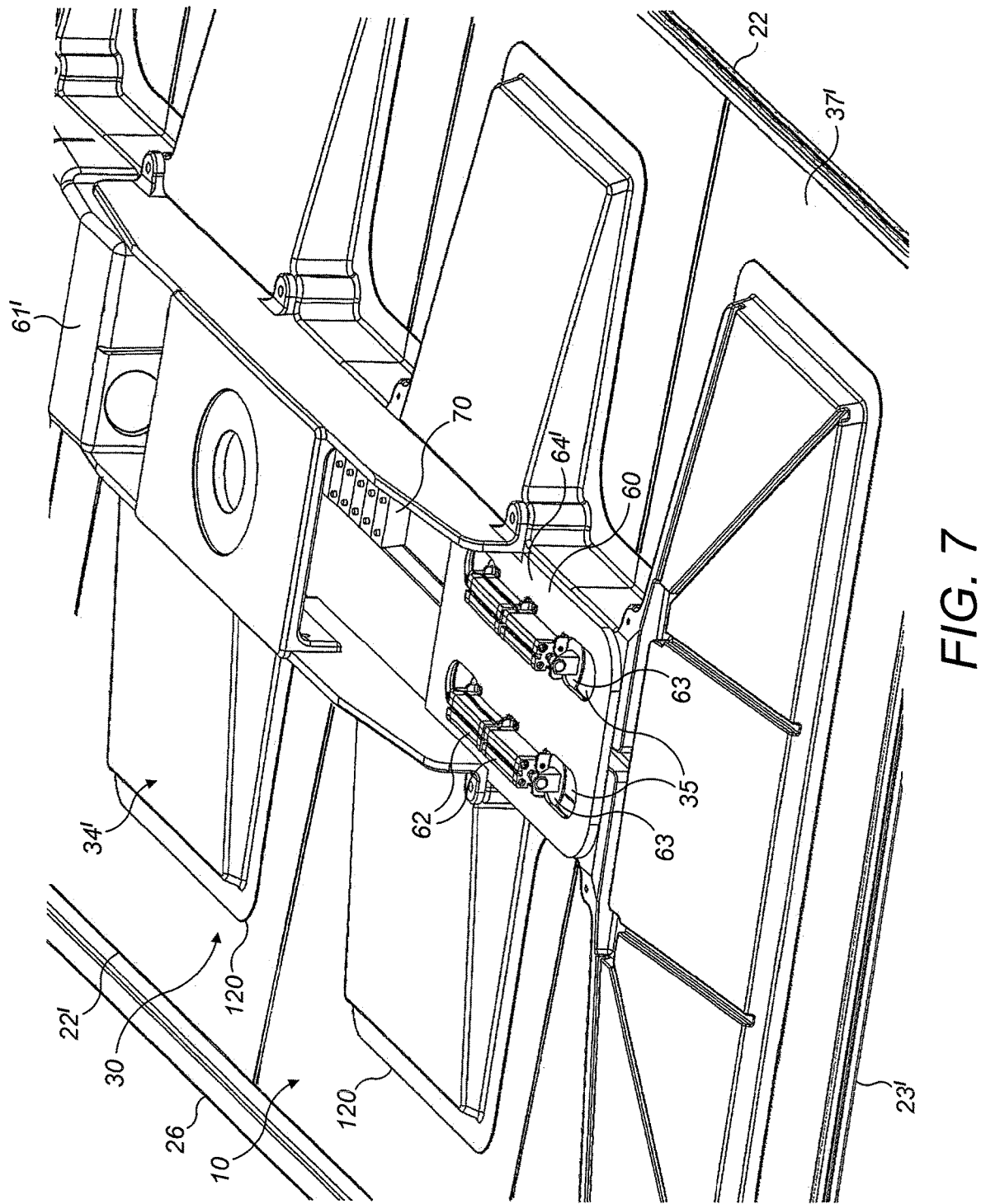
FIG. 7 is an enlarged view from above of one end of the vacuum lifter apparatus of FIG. 2, with a protective cover having been removed to expose one set of four of the valve mechanisms, each of the valve mechanisms being mounted on a common mounting plate that comprises on a lower side four valve plate seats each of which has an upper valve aperture and a slideable valve plate driven by a pneumatic piston actuator mounted on an upper side of the mounting plate.
Figure 8:
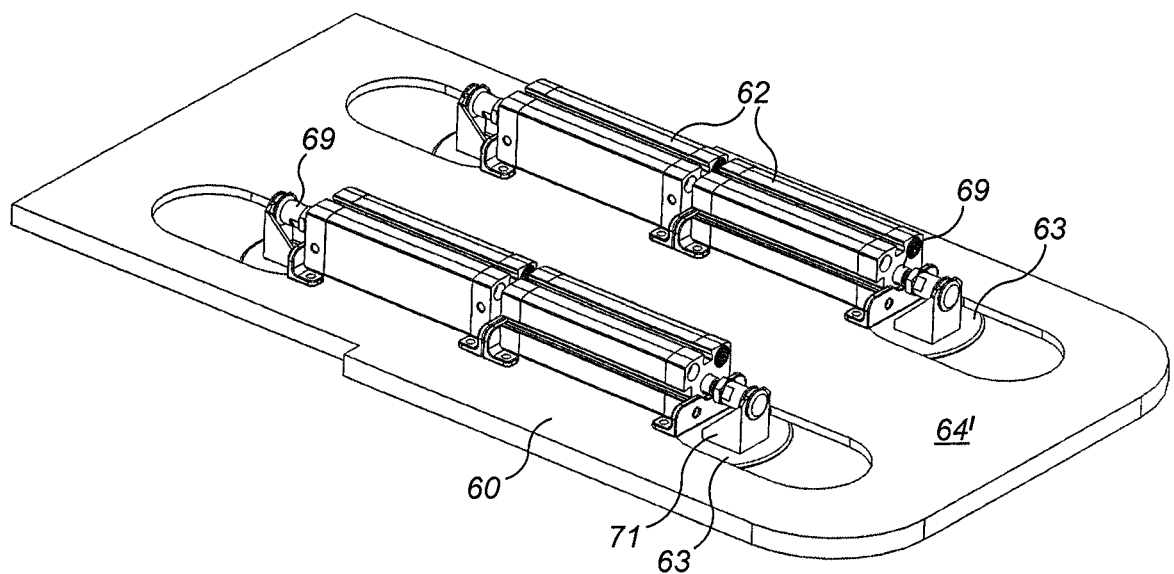
FIG. 8 shows an enlarged view of the set of four valve mechanisms of FIG. 7.
Figure 10:
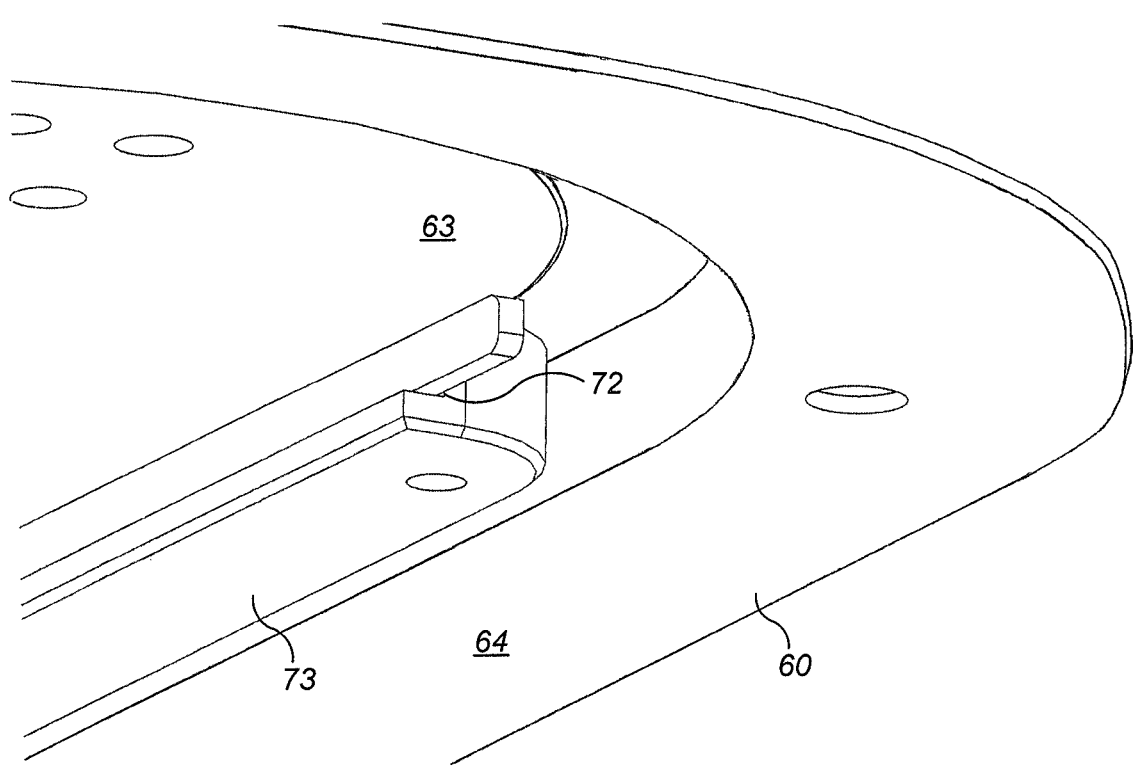
FIG. 10 shows an enlarged view of part of the underside of the common mounting plate of FIG. 7, with the one of the slideable valve plates moved to fully close the associated valve aperture.

As shown in FIG. 7, the valve actuators are linear actuators each of which drives a piston 69. The piston is connected to a bracket 71 affixed to the valve slider, this bracket extending upwards through the valve aperture 35. The valve plate has opposite lateral sides each of which slides inside a groove 72 provided by a pair of mirror-image side rails, one of which 73 is shown in FIG. 10.

Reference is now made to FIGS. 12 to 16, which show further details of the suction plate modules 40, 40', 40". The upper, lower and side plates of each module provide a substantially hollow housing 80. A substantially hollow interior 74 of each housing is spanned by a honeycomb reinforcing structure 75 which comprises contiguous hexagonal cells 76 having vertically extending cell walls 77 each of which is perforated by at least one aperture or hole 78 to allow cross-flow of air within the reinforcing structure towards cells which are within the footprint of one or another of the array of holes 13' in upper wall 12' of the suction plate 10. The bottom and top portions 79, 79' of each cell wall, or at least a substantially complete proportion of cells walls, are bonded by means of adhesive. The adhesive will, in general, be a liquid adhesive before curing to set the adhesive 81, shown schematically in FIG. 16 as zig-zag lines and in more detail in the section of FIG. 20, to corresponding lower and upper inner surfaces 82, 82' of the housing 80. It is preferred if substantially all of the cell wall bottom and top portions are bonded to the corresponding housing inner surfaces. The reinforcing structure is sandwiched between a lower tray, which is provided by the lower plate 37, and an upper lid, which is provided by the upper plate 37'.

Preferably, before bonding of the laterally air-permeable honeycomb reinforcing structure 75 inside the housing interior 74, the cells are secured within an outer frame or band 83 which may extend continuously around the periphery of the cells. L-shaped corner reinforcement tabs 84 may also be provided, which are preferably bonded to internal corners within the housing interior, to provide additional strength and seal any gaps between the folded side plate members.

Figure 16:
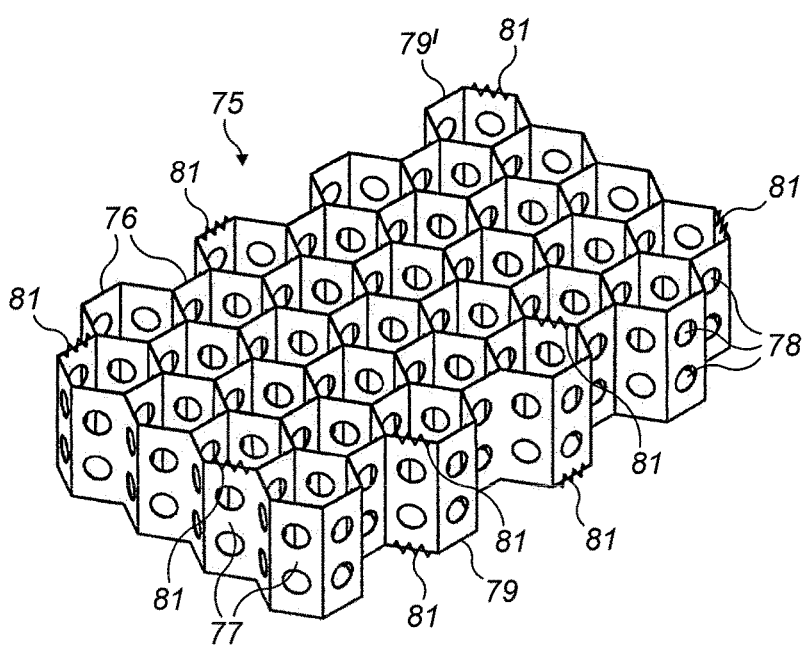
FIG. 16 is an enlarged view of the honeycomb structure of FIG. 15, showing how each of six hexagonal side walls is perforated to allow cross-flow of air within the reinforcing structure.

The reinforcing hexagonal cell structure is made from parallel metallic strips, bonded together along transverse lines and then punched through or drilled to form apertures for the cell walls. The strips are then pulled apart to form the cellular structure as shown in FIG. 16. When bonded inside the housing interior 74, this provides reinforcement against bending or twisting in the vertical direction, while adding little extra weight to the suction plate module. By keeping the weight down in this way, while maintaining sufficient rigidity, the size of the robotic arm and actuation system can be reduced while helping to increase the permissible acceleration in use.

Preferably, the rectangular array of suction holes 13 is made to fit regularly within the repeating honeycomb pattern of the reinforcing structure 75, in order to avoid a situation where some of the holes are beneath the cell walls or so close that the adhesive blocks some suction holes 13. This can be done by orienting one axis of the array of holes parallel with two opposite sides of the cell walls and the other axis therefore being perpendicular to these opposite cell walls. It can be shown that if "x" is the hexagonal cell wall length, then the array of holes 13 will fit regularly inside the hexagonal array of cell walls if the spacing of holes in the parallel direction is $3 \cdot x/2$ and the spacing of holes in the perpendicular direction is $x \cdot (\sqrt{3})/2$.

Figure 17:
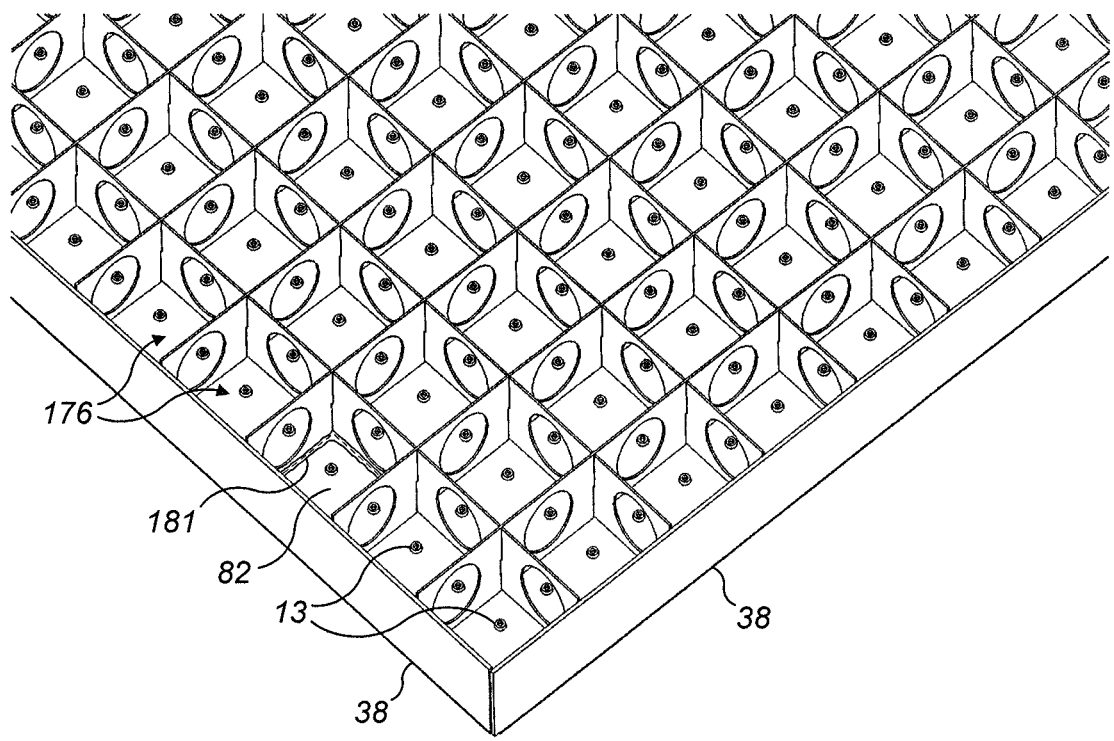
FIG. 17 is an enlarged perspective view of part of a second embodiment of vacuum plate module, showing the arrangement of holes in the lower wall of the vacuum plate with respect to an internal reinforcing structure formed from a grid of interlaced linear walls.
Figure 18:
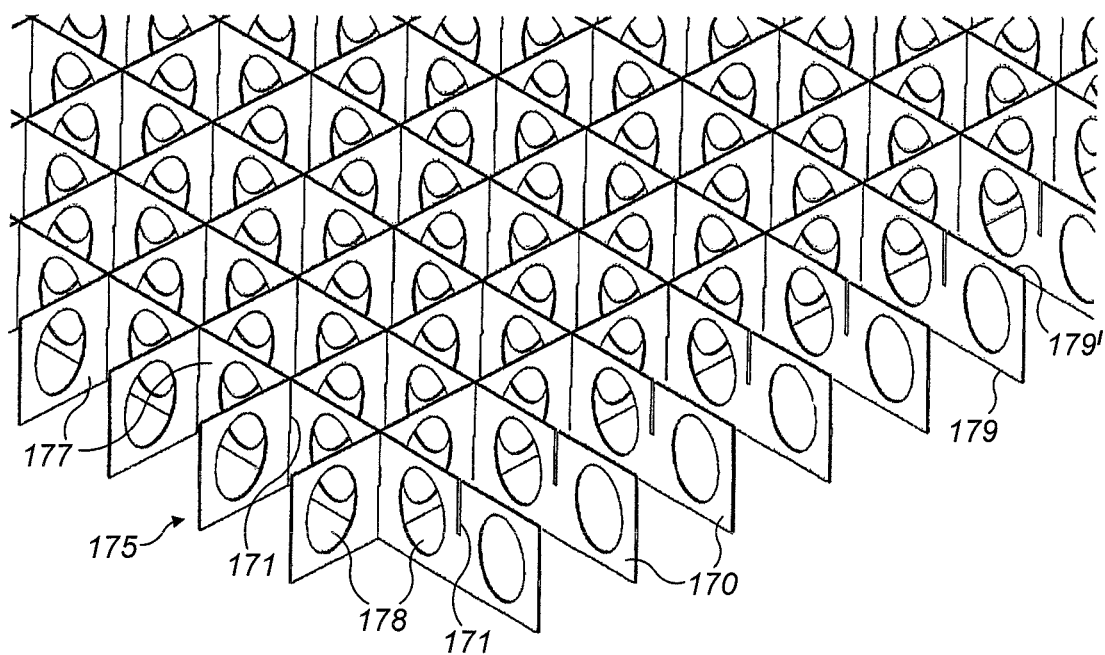
FIG. 18 is an enlarged perspective view of the interlaced linear walls of FIG. 17, with one wall removed to show how these slot together.

Reference is now made to FIGS. 17 and 18, which show an alternative reinforcing structure 175, which is in the form of a grid, which may be rectangular, but is preferably square. The grid reinforcing structure is made from two orthogonal sets of elongate parallel metallic strips 170, preferably aluminium sheet 1 mm thick, that provide square cells 176. The sets of strips intersect to provide four walls 177 for each cell 176.

Figure 9:
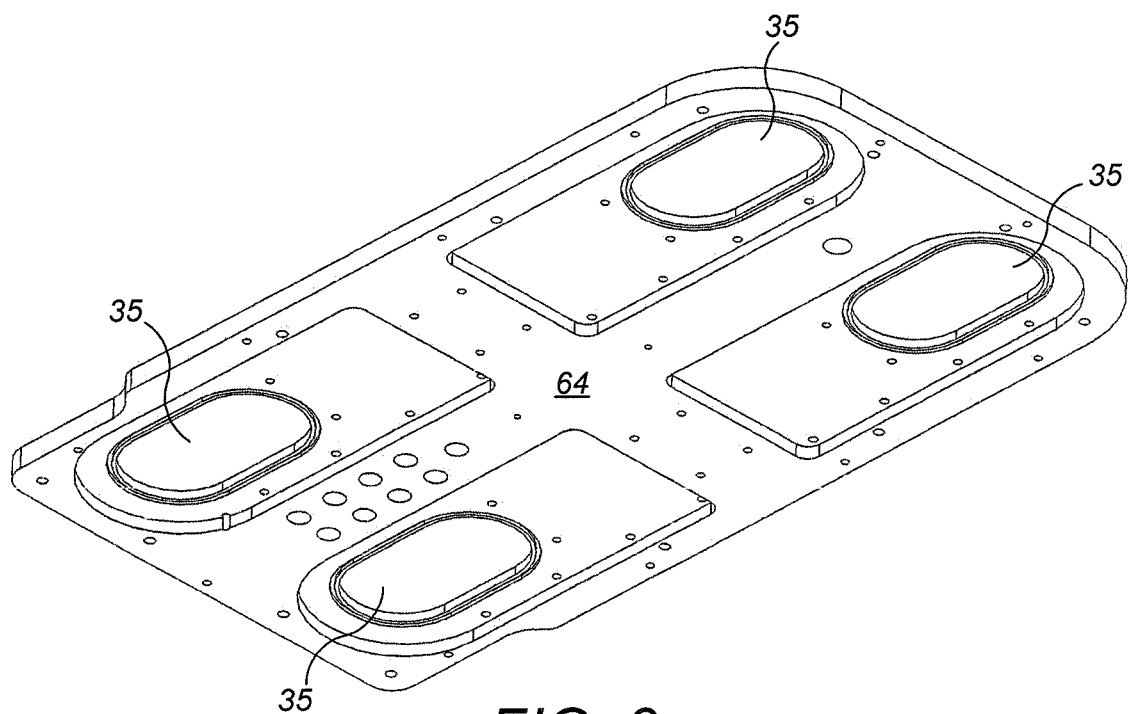
FIG. 9 shows an underside of the common mounting plate of FIG. 7, without the four slideable valve plates and associated actuators.

The individual strips of both sets are the same. The strips 170 have a length that spans the width or length of the hollow interior 74 of the module housing 80. Each strip has along its length spaced slots 171 that extend transversely across the width of each strip from one long edge, the length of each of the slots being just over half the width of the strip. The width of each slot is such each slot holds another strip extending at right angles, and the spacing of the slots is such that the slots of intersecting strips interleave with each other with the long edges aligned in parallel planes at lower and upper ends 179, 179' of the square cell walls. In FIG. 9, one of the walls 177 is omitted so that the slots 171 for receiving one strip can be seen fully.

The slots 171 are each formed by cutting a stack (not shown) of parallel strips with a saw. The strips are then placed in two jigs (not shown), each jig holding the strips in the correct parallel orientation and spacing. The jigs are then brought together to interengage all the slots at the same time. Optionally, the interengaging slots may be bonded together with adhesive to increase the strength of the reinforcing structure. When bonded inside the hollow interior 74 of the housing 80, this reinforcing structure provides reinforcement against bending or twisting in the vertical direction, while adding little extra weight to the vacuum plate module 40, 40', 40".

Another advantage of this arrangement is that the slot spacing can be equal to the reinforcing wall height, as illustrated, so that a single round hole 178 can be formed in the wall midway between each slot. These holes 178 are formed by drilling through the strips when these are held parallel together in a stack of strips.

A further advantage of this arrangement is that the grid can be aligned with the axes of the array of holes, and the hole spacing can be the same along both axes while still avoiding overlap of the suction holes 13.

Further reinforcement and weight reduction is provided by the way in which the arch-like portions of the chassis (i.e. those lobe-like, branched end parts providing each air chamber between suction plate and chassis) span each suction plate module, whilst providing a manifold for the suction plate having branched ends or lobes 120, one for each suction plate module. The transversely extending side walls of each lobe 120 provide lateral reinforcement across the width of the suction plate.

The chassis main body 50 is preferably moulded in a fibre-reinforced composite material, most preferably a carbon fibre composite. Localised stresses around eight internal corners 121 of the main chassis lobes 120 are relieved by eight L-shaped aluminium brackets 122 that are bolted to the lower side 34 of the chassis interior around the interior corners.

In addition, it is preferred if the brackets 51, 51', 51" are also moulded in a fibre-reinforced composite material, most preferably a carbon fibre composite. The suction panel modules are formed predominantly from sheet metal, for example aluminium or stainless steel. When assembled together, the suction panel and chassis provide truss-like reinforcement across the lateral extent of the assembled structure.

Figure 19:
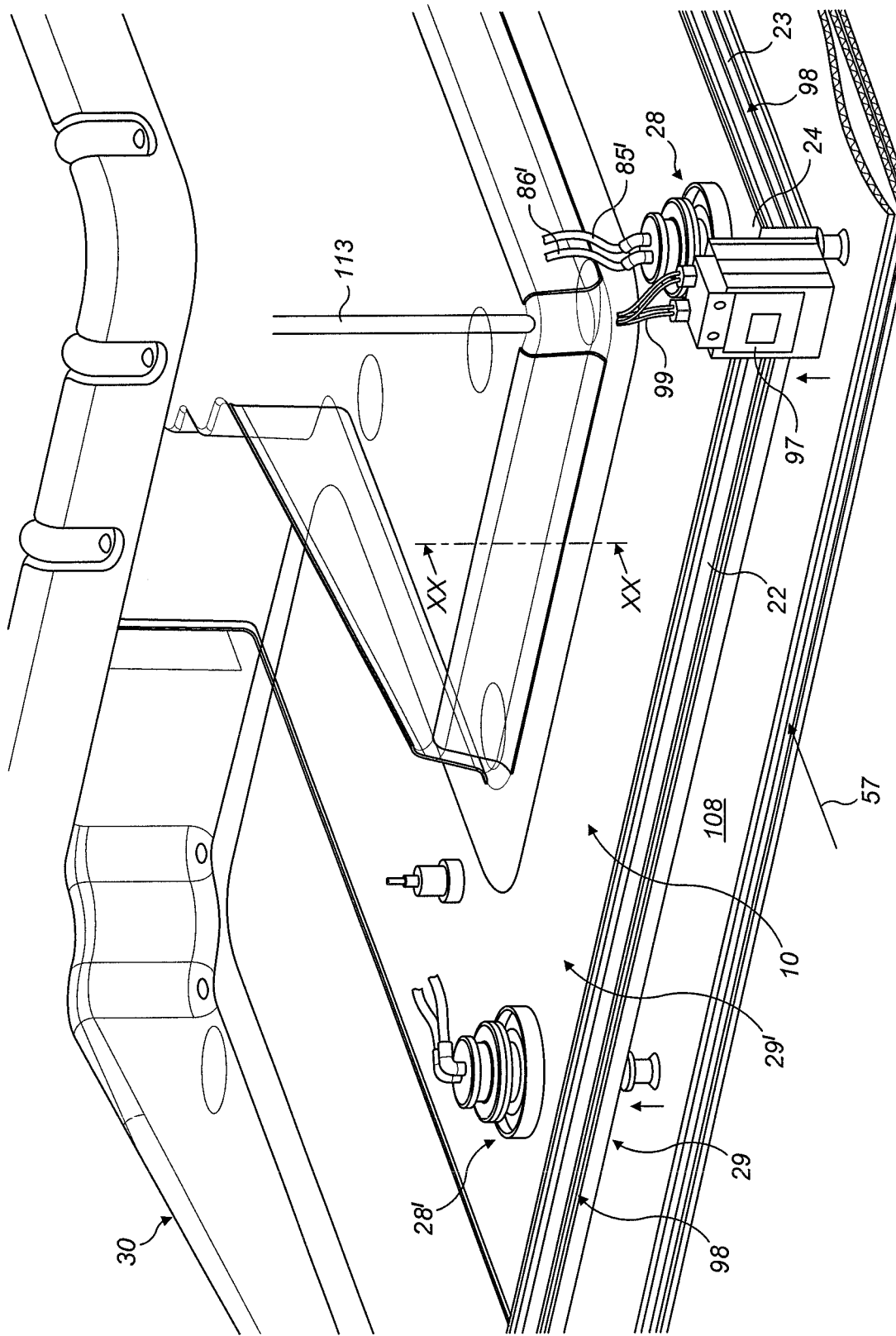
FIG. 19 is an enlarged perspective view of one corner of the vacuum lifter apparatus of FIG. 1 showing two suction lifters proximate an edge of the suction plate, each suction lifter extending through one of the suction modules to present a suction cup for lifting an edge of a sheet material article.
Figure 22:
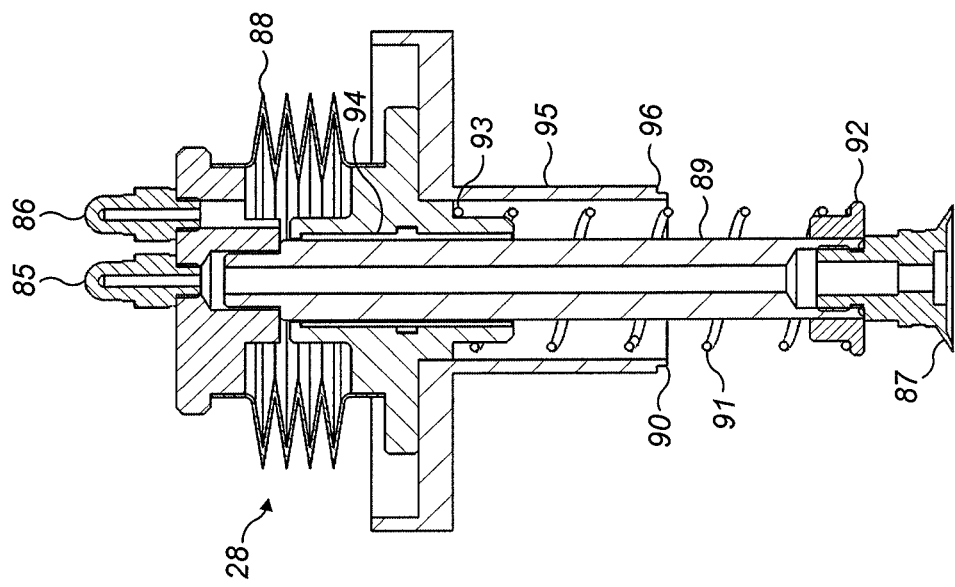
FIG. 22 is a cross-section view through the suction lifter of FIG. 21.
Figure 21:
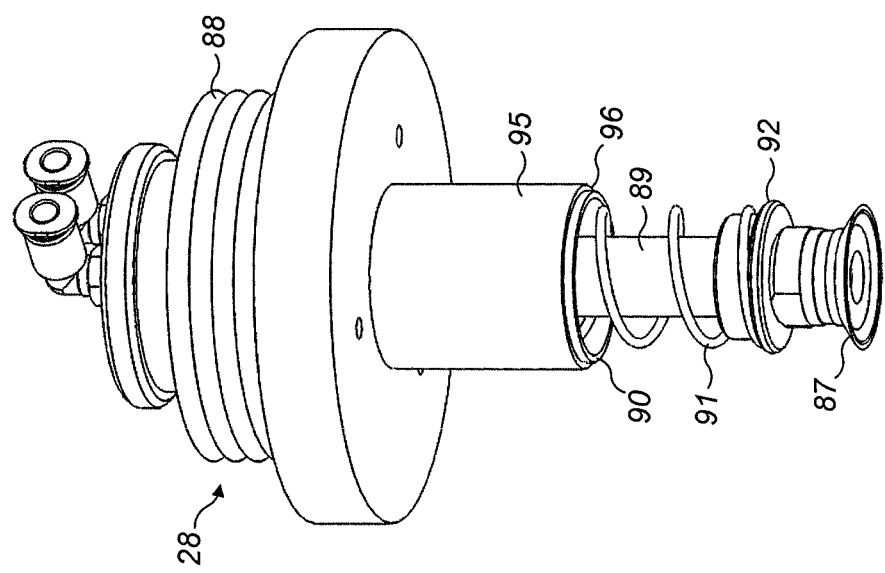
FIG. 21 is a perspective view of one of the suction lifters of FIG. 19.
Figure 23:
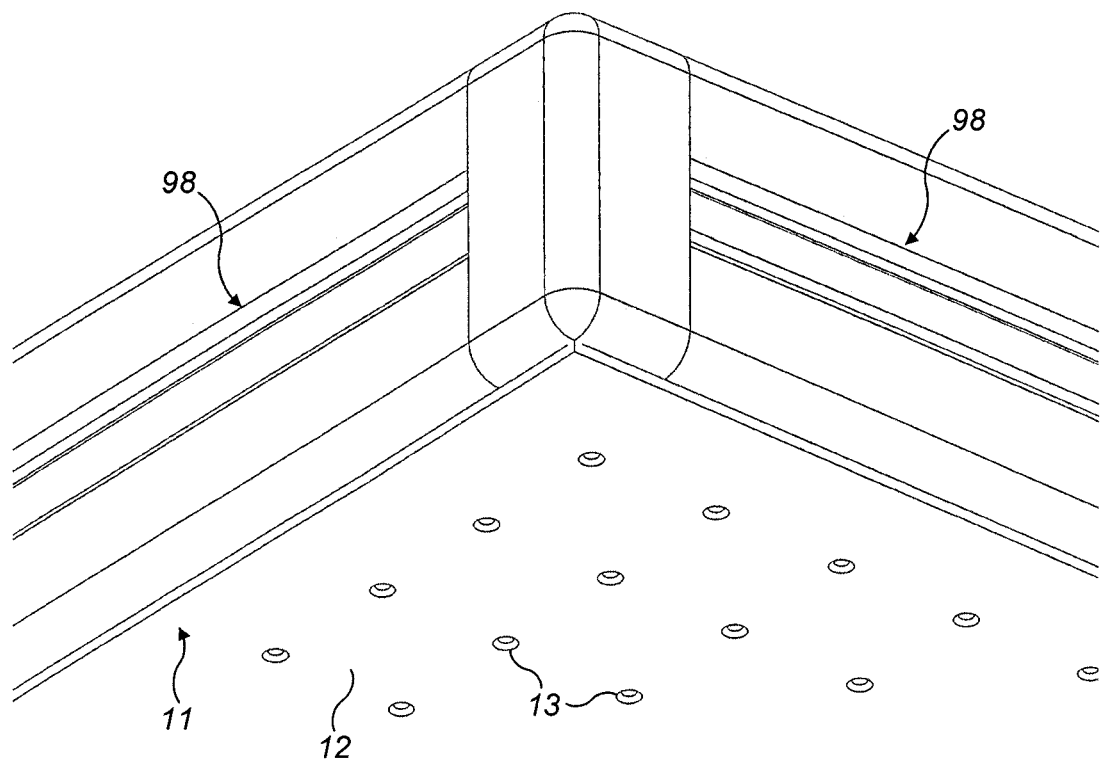
FIG. 23 is an enlarged perspective view of one corner of the suction plate of FIG. 1, showing mounting rails extending along the sides of the suction plate.
Figure 24:
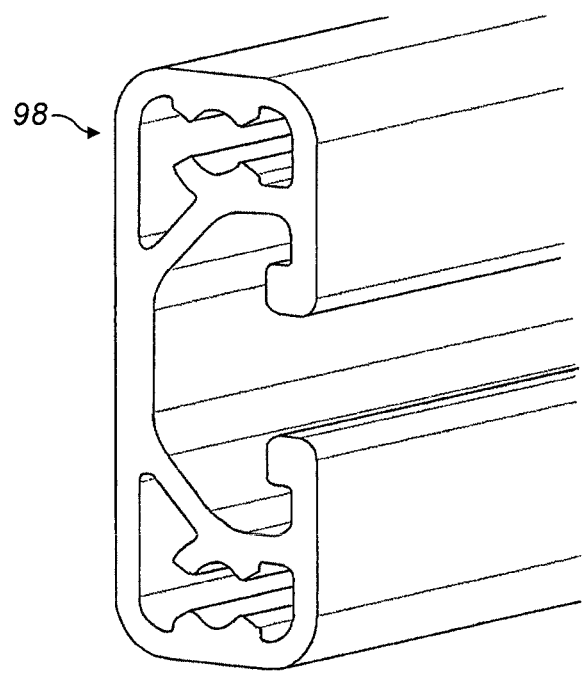
FIG. 24 is a perspective view in isolation of one of the mounting rails of FIG. 23.

Reference is now made to FIGS. 19, 21 and 22, which show in more detail the suction lifters 28, all of which are the same, apart from their locations on the suction plate 10. Each suction lifter comprises a downwardly oriented suction cup, 87 the cup being movably mounted in a substantially vertical direction relative to the suction plate 10. Each suction lifter is provided with a vacuum pressure from a source of air pressure, which may be both negative and positive air pressure 14, 14'. More generally, the suction cup is connected to a source of air pressure for providing air suction to the cup for plucking upwards a local area of the article to be lifted. In this example, the source of air pressure is the negative source of air pressure 14, however it is alternatively possible to generate a negative pressure at a suction cup using a positive source of pressure directed across a venturi pipe.

Each suction lifter also has two connections 85, 86 for air lines. One connection 85 is connected to a conduit 85' which runs, via one of the control valves 70 to the source of negative air pressure 14 for providing suction pressure to the downwardly directed compliant suction cup 87. The other connection 86 is connected to a conduit 86' which runs, via one of the control valves 70 to the source of positive air pressure 14' for providing a driving pressure to expand a bellows actuator 88 which pulls upwards a piston 89 on which the suction cup 87 is mounted. The piston is downwardly biased by a coil spring 91 surrounding the piston and which acts between an annular flange 92 proximate the suction cup 87 and an annular seat 93 around a sleeve 94 inside of which the piston 87 is slideably mounted.

A cylindrical outer sleeve 95 extends downwards away from the annular seat 93 and around a proximal portion of the piston when extended. The length of the outer sleeve is essentially the same as the thickness of the suction plate, between the lower and upper sides 29, 29', and the diameter is a close sliding fit inside the lower and upper clearance apertures 47, 47' for the suction lifters. Preferably, the lower clearance aperture 47 is of slightly smaller diameter than the upper clearance aperture, in which case a distal end 90 of the outer sleeve 95 is provided with an annular step 96 having a reduced diameter, as illustrated in FIGS. 21 and 22, so that the step in the outer sleeve can be used to make a secure join around the aperture in the lower side of the suction plate, for example with a bead of adhesive (not illustrated).

In normal operation, the positive pressure is applied to retract the piston until the suction cup 87 is recessed fully within the outer sleeve 95. In this orientation, the suction lifter does not affect the handling of the material by the suction plate 10. As shown in FIG. 19, when a sheet is to be lifted, the suction plate 10 is lowered into proximity with the sheet with no positive pressure applied to the bellows so that the suction lifters 28, 28', 28" are in the dropped orientation. Suction is then applied to the suction cup to pull a localised area 108 of the sheet material upwards, and optionally the suction plate may also be lifted to further disengage the top sheet from the one below. This admits air in the localised area between the top and bottom sheets, thereby helping to reduce problems in separating the layers owing to vacuum stiction from ambient air pressure, or mechanical or electrostatic stiction between very smooth surfaces. As a result, it is easier to subsequently peel upwards the top sheet, by then applying vacuum through the array of holes 13 in the lower wall 12 of the suction plate.

Optionally, a jet of air 57 may be laterally applied where the sheet is locally lifted in order to further separate the layers.

Preferably, the suction lifters are retracted while maintaining vacuum suction to the suction cups, thereby pulling the localised area 108 of the sheet directly up against the underside 29 of the suction plate 10.

Most preferably, the plurality of control valves 70 for the suction plate modules are activated sequentially, with those nearest the localised area 108 being activated first and those furthest away being activated last. This helps provide maximum vacuum to the first suction plate modules to be activated and also pulls the remainder of the sheet to the underside 29 of the suction plate 10 in a progressive manner, which can help to avoid wrinkles in very thin sheet material.

The localised area 108 is preferably either a strip along one edge of the sheet material article or a corner portion. This is so that the subsequent progressive lifting is directed away from the localised area towards other portions of the sheet not yet peeled up from the stack of articles, or from the work surface. A particular advantage of this is that the sheet material article becomes progressively adhered to the vacuum lifting surface, which can help to flatten out any wrinkles or other types of unevenness in the lifted sheet material article 5. This overcomes a problem with cardboard, which often becomes distorted from a planar orientation, particularly when the relative humidity of the air is elevated. In the prior art, when a vacuum lifter makes contact at the same time across the full extent of a sheet to be lifted, such unevenness can result in creases or other types of non-planar forms being exaggerated or impressed into the lifted sheet material.

Figure 20:
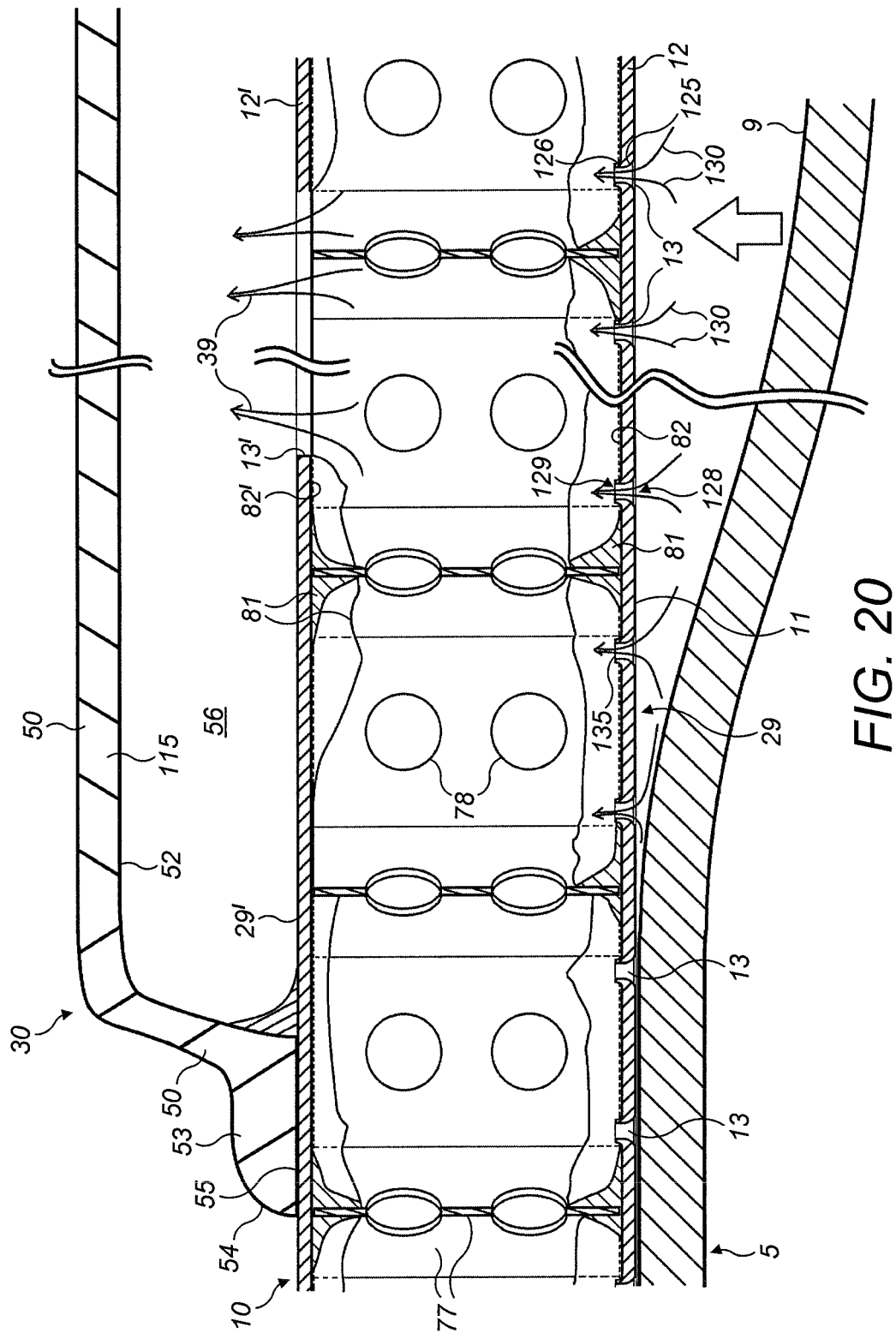
FIG. 20 is a schematic cross-section through the assembled module housing and reinforcing honeycomb matrix, taken along line XX-XX of FIG. 19, showing how the holes have internally raised rims which prevent adhesive within the module housing from blocking the hole.

The progressive lifting of the sheet material article 5 is shown in FIG. 20. Once the localised portion 108 is adhered, the suction from adjacent suction holes 13 pulls adjacent areas upwards first, and the sheet material is then peeled upwards in directions extending away from the initial localised area 108.

The suction holes 13 in the lower wall of the suction plate are preferably punched holes, not drilled holes, produced by a punch and die. As shown in FIG. 20, each hole 13 presents on the lower surface 11 of the suction plate 10 an outwards funnel surface 125 at the entrance to a main bore 126 of the hole in the metal sheet, having a corresponding convex curve that expands radially outwardly from the main, substantially cylindrical part of the bore of the hole, so that the surface of the punched hole 13 expands outwards progressively with a bell shape, for example like a trumpet bell. The funnel surface therefore provides a downwardly flared entrance 128 to airflow 130 into the bore 89 of the hole 13. Opposite this entrance 128, the bore has an exit 129 for the air pulled through the hole, this exit being surrounded by a rim 135 that extends above the surrounding inner surface 82 of the lower wall 12 of the vacuum plate 10. A particular advantage of the rims 135 is that these help to prevent flow of adhesive 81 into the holes prior to curing of the adhesive.

The increased suction area afforded by the bell shaped entrances 128 to the suction holes 13 increases the suction force for the provided suction air pressure. The smooth internal surfaces of the holes when produced by punching, as opposed to drilling, increases the air flow velocity and results in more efficient generation of suction lifting pressure.

The adhesive 81 bonding the honeycomb or grid structure to the internal lower and upper walls 12, 12' of the module housing will, in general, be applied as a liquid adhesive before curing to set the adhesive, as shown in FIG. 20. This can be done by dipping one end of the cell walls in an adhesive. The adhesive will lap most or all of the abutment between the cell walls and adjacent 82, 82' of the lower and upper walls 12, 12'.

FIGS. 1, 19, 23 and 24 also show how the suction plate has one or more downwardly oriented video cameras 97 mounted to a track or rail 98 that is provided on at least one edge 22 of the suction plate. The mounting rail allows the video camera to be slid along the length of the edge to a desired position.

Electrical connections 99 run from the video camera to the controller 8 so that the camera can be used a part of a machine vision system to permit more accurate positioning of the suction plate during lifting and deposition of sheet material.

Figure 25:
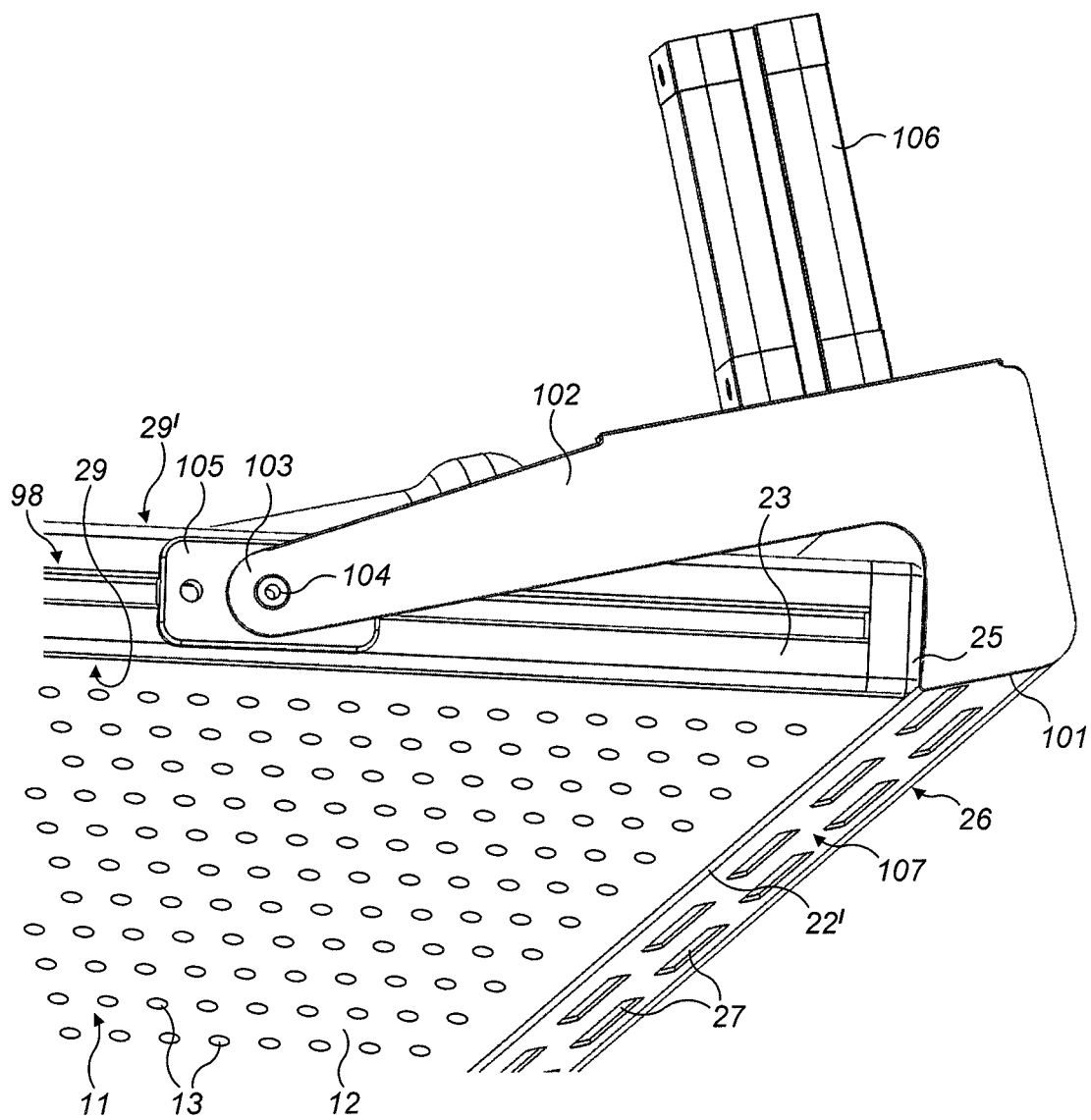
FIG. 25 is an enlarged perspective view from below of one corner of the vacuum lifter apparatus of FIG. 1, showing an elongate bar movably mounted along an edge of the suction plate, the bar being in a raised orientation and having nozzles for downwardly directing a vacuum suction along the length of the bar.
Figure 26:
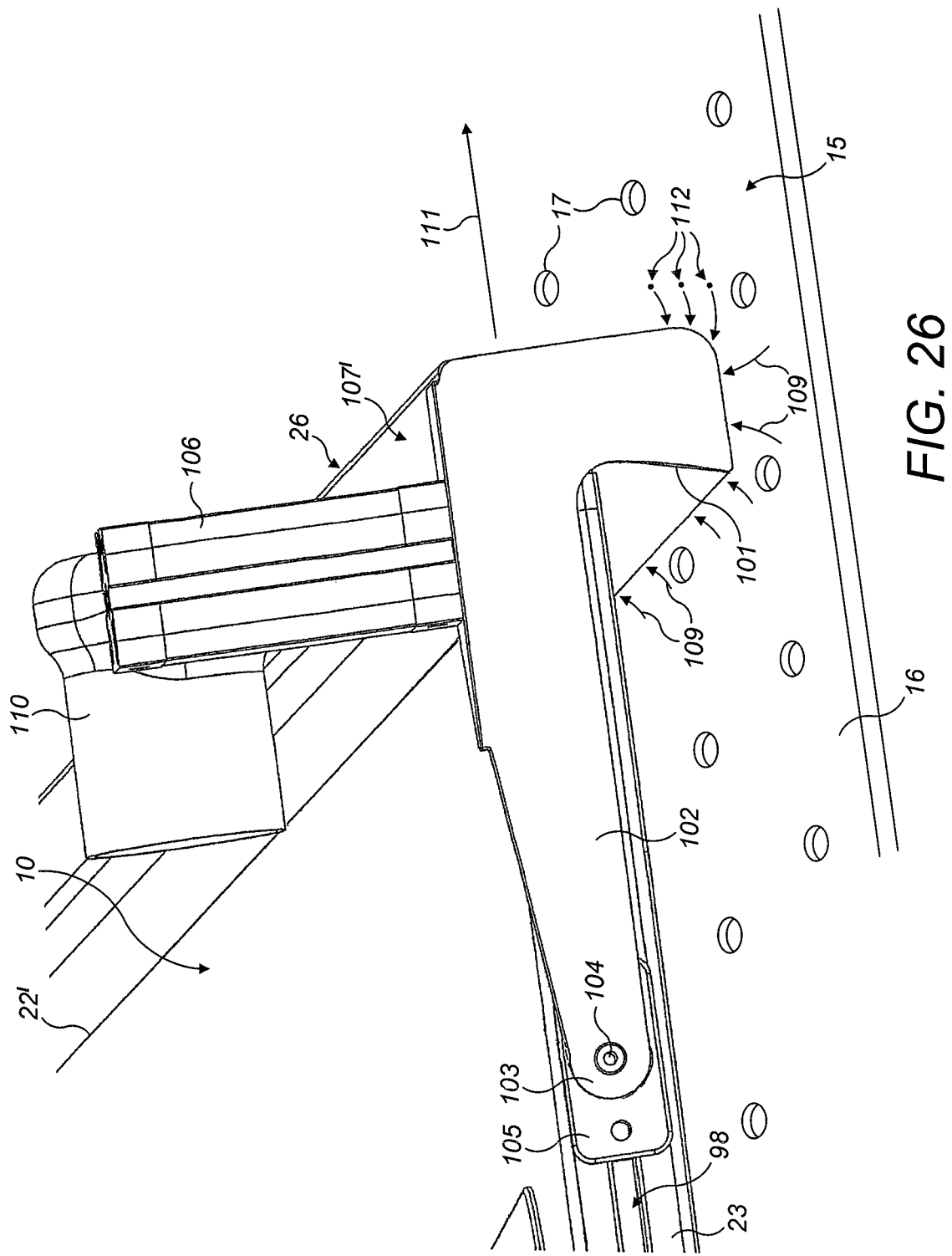
FIG. 26 is an enlarged perspective view of the corner and bar of FIG. 25, showing the bar in a lowered orientation and being used to apply suction air flow onto the empty work surface of the cutting work station as the vacuum lifter apparatus is moved by the lifter actuation system so that the vacuum sweeps across the work surface.

FIGS. 25 and 26 show the elongate movable bar 26 in more detail. The bar has opposite ends 101 from each of which a pivot arm 102 extends in a direction transverse to the length of the bar. The arm has at a distal end 103 a pivot joint 104, by which the arm and bar are pivotably connected to a mounting bracket 105, that is also secured to a mounting track or rail 98' similar to the one mentioned above.

A pair of linear actuators 106, 106', in this case pneumatic actuators, is provided, one at each end 101, 101' of the bar 26, which act downwards on the suction plate upper side 29' to move the bar up and down. The linear actuators are controlled via corresponding ones of the control valves 70. When up, a lower surface 107 of the bar is at or slightly above the level of the underside 29 of the suction plate 10. When down, the lower surface is beneath the level of the underside of the suction plate.

The lower side 107 of the bar is perforated along its length by nozzles 27 for providing a suction airflow 109 along the length of the bar. The bar has a hollow interior (not illustrated), which acts as a plenum chamber of the nozzles. An upper side 107' of the bar 26 is provided with at least one air outlet connection 110 for connection to the negative source of air pressure 14. Prior to lifting a sheet, or depositing a sheet on the work station surface 15, the bar may be used to vacuum debris off the corresponding upper surface. FIG. 26 shows the vacuuming of the work surface; the same principles apply when vacuuming the top of a sheet material article. The controller 8 controls the positioning of the suction plate 10 to bring this into proximity with the surface, at one side of an area to be vacuumed. The controller then activates the linear actuators 106, 106' to lower the bar, which drops under its own weight into position for vacuuming. The controller then activates the source of negative air pressure and moves the suction plate in a direction transverse, and preferably perpendicularly, to the length of the bar, either in the direction 111 shown in FIG. 26 or the opposite direction. Any dust or debris 112 on the surface will then be vacuumed by the suction airflow 109.

After the vacuuming operation is completed, the controller shuts off the flow of air from the source of negative air pressure 14 and activates the linear actuators 106, 106' to raise the bar 26 into the raised position, as shown in FIG. 25.

As will be appreciated from the above discussion, there are numerous electrical wires, or conduits for air flow or pneumatic lines to be made to devices around the periphery of the suction plate. Some devices, such as cameras, may also employ fibre optic connections. It is important to protect such cables, air lines or conduits. Therefore, the upper side 34' of the chassis main body 50 is preferably provided with number of channels or grooves 113 therein, generally radiating outwards from the region of the mounting bracket 100. For clarity, not all such wires, cables or conduits are shown in all drawings, however, at least some of these are preferably routed within the grooves, and preferably covered over at points with adhesive tape or cable tie-downs (not shown), to provide protection and help prevent such components from moving relative to the chassis, and possibly causing wear or stress, for example at connections.

The invention, in its various aspects, as defined by the accompanying claims, therefore provides a versatile, and relatively strong and lightweight vacuum lifter apparatus which may be employed in different modes of operation as part of an automated sheet material processing apparatus in which sheet material articles are to be lifted and deposited at various locations or work stations.

LISTING OF REFERENCE NUMERALS 1 sheet material processing apparatus
2 sheet material cutting work station
3 vacuum plate lifting system
4 vacuum lifter apparatus
5 sheet material articles
5' processed sheet material articles
6 sheet material lifter actuation system
7 five-axis robotic arm
8 control system
9 upper surface of sheet material articles
10 suction plate
11 suction lifting surface of suction plate
12 lower wall of suction plate
12' upper wall of suction plate
13 array of holes in lower wall of suction plate
13' array of holes in upper wall of suction plate
14 source of negative and positive air pressure
15 cutting surface
16 table top or plate
17 holes in table top or plate
18 input stack of sheet material articles
18' output stack of processed sheet material articles
19 cut lines in processed sheet material article
19' fold lines in processed sheet material article
20 movable blade of cutting work station
21 useful material of processed sheet material article
21' waste material of processed sheet material article
22 first long edge of suction plate
22' second long edge of suction plate
23 first short edge of suction plate
23' second short edge of suction plate
24 first corner or vertex of suction plate
24' second corner or vertex of suction plate
25 third corner or vertex of suction plate
25' fourth corner or vertex of suction plate
26 elongate movable bar
27 nozzles along length of bar
28 suction lifters proximate first and second vertexes
28 first suction lifter
28' second suction lifter
28" third suction lifter 29 lower side of the suction plate
29' upper side of the suction plate
30 upper chassis
31 first group of three suction lifters
31' second group of three suction lifters
32 air outlet on chassis
33 flexible hose of airflow suction system
34 lower side of the chassis
34' upper side of the chassis
35 valve apertures
36 suction plate portions
37 lower plate of suction plate module
37' upper plate of suction plate module
38 edges of lower plate
38' edges of upper plate
39 air flow paths to valve apertures
40 suction plate module (first type)
40' suction plate module (second type)
40" suction plate module (third type)
41-44 outer side plate members of lower plate (first type)
41'-44' outer side plate members of lower plate (second type)
41"-44" outer side plate members of lower plate (third type)
45 inner side plate members of upper plate
46 fold line in lower plate
46' fold line in upper plate
47 clearance apertures for suction lifters in lower plate
47' clearance apertures for suction lifters in upper plate
48 tabs formed by upwards protections of outer side plate members
49 flanges provided by extensions of outer side plate members
49' slots provided by opposed brackets
50 main body of chassis
51 brackets affixed to underside of main body of chassis (first type)
51' brackets affixed to underside of main body of chassis (second type)
51" brackets affixed to underside of main body of chassis (third type)
52 concave lower side of main body of chassis
53 rim of chassis main body
54 peripheral edge of rim of main body
55 downwardly facing surface of rim of main body
56 air chambers between suction plate and chassis
57 jet of air
58 first valve manifold
58' second valve manifold
59 connecting pipe between first and second valve manifolds
60 first valve plate
60' second valve plate
61 first valve manifold cover
61' second valve manifold cover
62 valve actuators
63 valve sliders
64 upstream faces of the valve plates
64' downstream faces of the valve plates
65 layer of cured adhesive holding flanges together
66 cruciform junction of flanges
66' cruciform junction of slots between brackets
67 peripheral region of the upstream face of valve plate
68 gasket for valve plate
69 valve actuator piston
70 control valves
71 valve plate bracket
72 grooves in which valve slide plate lateral edges slide
73 slide rails providing grooves
74 substantially hollow interior of housing
75 honeycomb reinforcing structure
76 hexagonal cells of honeycomb reinforcing structure
77 vertically extending walls of hexagonal cells
78 lateral aperture or holes in hexagonal cell walls
79 bottom portions of hexagonal cell walls
79' top portions of hexagonal cell walls
80 suction plate module housing
81 adhesive for bonding cell walls to housing inner surfaces
82 housing lower inner surface
82' housing upper inner surface
83 outer frame for honeycomb reinforcing structure
84 corner reinforcement tabs
85 connections on suction lifter for negative pressure
85' connection conduit for negative pressure
86 connections on suction lifter for positive pressure
86' connection conduit for positive pressure
87 suction cup
88 bellows actuator
89 piston of suction lifter
90 distal end of outer sleeve
91 coil spring
92 annular flange proximate suction cup
93 annular seat for coil spring
94 piston sleeve
95 outer sleeve around spring and piston
96 annular step in distal end of outer sleeve
97 video cameras
98 mounting rail
99 electrical connections to video camera
100 mounting bracket of chassis
101, 101' opposite ends of bar
102 pivot arm
103 distal end of pivot arm
104 pivot joint
105 mounting bracket for pivot joint
106, 106' linear actuators for bar
107 lower side of bar
107' upper side of bar
108 localised area of sheet
109 suction airflow of air from nozzles
110 air outlet connection for bar
111 bar sweeping direction
112 vacuumed dust or debris
113 grooves in upper side of chassis main body
115 upper wall of chassis
120 lobes of chassis manifold
121 internal corners of lobes
122 L-shaped brackets in internal corners of chassis interior
125 outwards funnel surface holes in lower wall of suction plate
126 main bore of holes in lower wall of suction plate
128 downwardly flared entrance main bore of holes of suction plate
129 exit for the air pulled through the holes in lower wall of suction plate
135 rim surrounding the air exit of holes of suction plate.
170 strips of metal used to form square grid reinforcement
171 slots in strips
175 grid reinforcing structure
176 square cells of grid reinforcing structure
177 vertically extending interlaced linear walls
178 lateral aperture or holes in square cell walls
179 second (upper) ends of square cell walls
179' first (lower) ends of square cell walls
181 adhesive for bonding cell walls to module housing inner surfaces Many alterations and modifications may be made by those having ordinary skill in the art, given the benefit of the present disclosure, without departing from the spirit and scope of the inventive subject matter. Therefore, it must be understood that the illustrated embodiments have been set forth as examples, and that the present disclosure should not be taken as limiting the inventive subject matter as defined by the following claims. The following claims are to be read to include not only the combinations of elements which are literally set forth but also all equivalent elements for performing substantially the same function in substantially the same way to obtain substantially the same result. The claims are thus to be understood to include what is specifically illustrated and described above, what is conceptually equivalent, and also anything that incorporates any of the essential ideas of the inventive subject matter.

The invention claimed is:

1. A vacuum plate lifting system for lifting sheet material articles, comprising a vacuum lifter apparatus for lifting sheet material articles, a lifter actuation system configured to lift and/or move the vacuum lifter apparatus during use and a control system, the control system being configured to control the lifter actuation system during said movement, the vacuum lifter apparatus comprising:
   a substantially horizontal suction plate comprising a perforated suction lifting surface, said surface being downwardly oriented for making contact with an upper surface of said articles to be lifted;
   an airflow suction system for conveying vacuum air pressure to said perforated suction lifting surface;
   at least one mount for connection of the suction plate to at least one actuator of the lifter actuation system for lifting and/or moving the suction plate during use, wherein:
   the vacuum plate lifting system further comprises at least one elongate bar movably mounted along an edge of the suction plate, said bar comprising one or more nozzles, said nozzles being connected to a source of air pressure for providing a suction airflow of air into said nozzles;
   a bar actuation system configured to drive movement of said bar between a raised orientation in which the bar is raised relative to level of said suction lifting surface and a lowered orientation in which the bar is substantially at or below the level of said suction lifting surface whereby, in use, said suction airflow acts on a surface to be cleaned beneath said suction lifting surface when said bar is in the lowered orientation; and
   wherein the control system is operable to control the operation of the lifter actuation system and the operation of the bar actuation system to provide a sweeping movement of said bar in said lowered orientation across said surface to be cleaned whereby said suction airflow sweeps across said surface to be cleaned.

2. The vacuum plate lifting system of claim 1, in which the suction plate is substantially square or rectangular in a horizontal plane, and said bar is mounted along a substantially straight edge of the suction plate.

3. The vacuum plate lifting system of claim 2, in which there is one bar mounted along said edge of the suction plate.

4. The vacuum plate lifting system of claim 1, in which there is one bar mounted along said edge of the suction plate.

5. The vacuum plate lifting system of claim 4, in which said bar is movably mounted to the suction plate at a pair of hinges proximate opposite ends of said bar.

6. The vacuum plate lifting system of claim 5, in which each of said hinges is pivotably mounted to an edge of the suction plate adjacent the edge of the suction plate along which the bar is mounted.

7. The vacuum plate lifting system of claim 5, in which said bar is movably mounted to the suction plate at a pair of hinges proximate opposite ends of said bar.

8. The vacuum plate lifting system of claim 1, in which said nozzle is an elongate slot in an outer face of said bar, said slot extending in a direction substantially parallel with the length of the bar.

9. The vacuum plate lifting system of claim 8, in which each of said hinges is pivotably mounted to an edge of the suction plate adjacent the edge of the suction plate along which the bar is mounted.

10. The vacuum plate lifting system of claim 1, in which the lifter actuation system comprises a robotic arm configured to lift and/or move the vacuum lifter apparatus during use.

11. The vacuum plate lifting system of claim 1, in which the vacuum lifter apparatus comprises at least one mount on an upper surface thereof, the actuation system being physically connected to the suction plate via said mount.

12. The vacuum plate lifting system of claim 1, in which the bar actuation system comprises a pneumatic lifter acting between an upper surface of the suction plate and said bar.

13. A method of using a vacuum plate lifting system to sweep dust or debris from a surface to be cleaned, the vacuum plate lifting system being as claimed in claim 1, and the method comprising the steps of:
   using the control system to control the movement of said bar by the bar lifter system to place said bar in the raised orientation;
   with said bar in the raised orientation, using the control system to control the movement of the vacuum lifter apparatus by the lifter actuation system during lifting by the suction lifting surface of a sheet material article from a work surface and subsequent deposition of said lifted article away from the work surface;
   using the control system to control the movement of said bar by the bar lifter system to place said bar in the lowered orientation;
   after said deposition, using the control system to control the movement of the vacuum lifter apparatus by the lifter actuation system to return the suction lifting surface above a surface to be cleaned;
   with said bar in the lowered orientation, applying said suction airflow across said surface to be cleaned while using the control system to control a sweeping movement of said bar across said surface to be cleaned whereby said vacuum airflow sweeps across said surface to be cleaned to remove dust or debris from said surface.

* * * * *